US010609278B2

(12) United States Patent
Wu et al.

(10) Patent No.: US 10,609,278 B2
(45) Date of Patent: Mar. 31, 2020

(54) SYSTEMS AND METHODS FOR IMPROVED MOBILE PLATFORM IMAGING

(71) Applicant: SZ DJI TECHNOLOGY CO., LTD., Shenzhen (CN)

(72) Inventors: Jun Wu, Shenzhen (CN); Ran Liao, Shenzhen (CN); Zisheng Cao, Shenzhen (CN); Ye Tao, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 16/242,346

(22) Filed: Jan. 8, 2019

(65) Prior Publication Data

US 2019/0149724 A1 May 16, 2019

Related U.S. Application Data

(63) Continuation of application No. PCT/CN2016/089450, filed on Jul. 8, 2016.

(51) Int. Cl.
*H04N 5/232* (2006.01)
*B64C 39/02* (2006.01)
*G06T 1/00* (2006.01)
*B64D 47/08* (2006.01)

(52) U.S. Cl.
CPC ....... *H04N 5/23216* (2013.01); *B64C 39/024* (2013.01); *G06T 1/0007* (2013.01); *H04N 5/232* (2013.01); *H04N 5/23203* (2013.01); *H04N 5/23222* (2013.01); *B64C 2201/027* (2013.01); *B64C 2201/108* (2013.01); *B64C 2201/123* (2013.01); *B64C 2201/127* (2013.01); *B64C 2201/165* (2013.01); *B64D 47/08* (2013.01)

(58) Field of Classification Search
CPC ............... H04N 5/23216; H04N 5/232; H04N 5/23222; H04N 5/23203; G06T 1/0007; B64C 39/024; B64C 2201/123; B64C 2201/108; B64C 2201/127; B64C 2201/027; B64C 2201/165; B64D 47/08
USPC ....................................................... 348/144
See application file for complete search history.

(56) References Cited

U.S. PATENT DOCUMENTS 10,086,937 B2 * 10/2018 Matsue ................. B64C 39/024
10,212,346 B2 *  2/2019 Harris ................ H04N 5/23287
2015/0298822 A1 * 10/2015 Eline .................... B64C 39/024
244/75.1

(Continued)

FOREIGN PATENT DOCUMENTS

CN       102809969 A    12/2012
WO    2016108342 A1     7/2016

OTHER PUBLICATIONS

The World Intellectual Property Organization (WIPO) International Search Report and Written Opinion for PCT/CN2016/089450 dated Mar. 31, 2017 7 pages.

*Primary Examiner* — Tung T Vo
(74) *Attorney, Agent, or Firm* — Anova Law Group, PLLC

(57) ABSTRACT

A method of imaging on a mobile platform includes exposing an imaging device mounted aboard the mobile platform at a plurality of positions of a component of the mobile platform to obtain images, determining, using the images, allowed positions of the component that do not obstruct a field-of-view of the imaging device, and controlling the imaging device according to the allowed positions to avoid imaging the component.

10 Claims, 21 Drawing Sheets

(56) References Cited

U.S. PATENT DOCUMENTS

| | | | |
|---|---|---|---|
| 2016/0122018 A1* | 5/2016 | Matsue | B64C 39/024 244/17.13 |
| 2016/0194092 A1* | 7/2016 | Szarek | B64C 39/024 701/36 |
| 2016/0352992 A1* | 12/2016 | Saika | H04N 5/2328 |
| 2017/0291439 A1* | 10/2017 | Koyata | B41J 29/38 |
| 2019/0013578 A1* | 1/2019 | Ni | H01Q 3/02 |
| 2019/0092447 A1* | 3/2019 | Schwarzbach | B64C 27/08 |

* cited by examiner

SYSTEMS AND METHODS FOR IMPROVED MOBILE PLATFORM IMAGING

CROSS-REFERENCE TO RELATED APPLICATION

This application is a continuation of International Application No. PCT/CN2016/089450, filed on Jul. 8, 2016, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

The disclosed embodiments relate generally to mobile platforms and more particularly, but not exclusively, systems and methods for improving imaging aboard mobile platforms.

BACKGROUND

Mobile platforms such as unmanned aerial vehicles (UAVs) can be used for performing surveillance, reconnaissance, and exploration tasks for various applications. A mobile platform can be outfitted with an imaging device for capturing images of a surrounding environment. However, at certain imaging angles, rotating propeller blades or other components of the mobile platform can undesirably appear in the field-of-view of the imaging device, resulting in images that need to be cropped or discarded. Such interference results in a limited useful field-of-view for the imaging device. Eliminating such interference by design and selective placement of the imaging device aboard the mobile platform is typically impractical.

In view of the foregoing, there exists a need for systems and methods for avoiding imaging interference on mobile platforms.

SUMMARY

In accordance with a first aspect disclosed herein, there is set forth a method of imaging on a mobile platform, comprising: exposing an imaging device mounted aboard the mobile platform at a plurality of positions of components of the mobile platform to obtain images; determining, using the images, allowed positions of the components that do not obstruct a field-of-view of the imaging device; and controlling the imaging device according to the allowed positions to avoid imaging the components.

In accordance with another aspect disclosed herein, there is set forth a method of operating a mobile platform, comprising: determining a threshold angle relative to the mobile platform of an imaging device mounted to the mobile platform that avoids obstruction of the field-of-view of the imaging device by one or more components of the mobile platform; and controlling the mobile platform according to the threshold angle.

In accordance with another aspect disclosed herein, there is set forth a mobile platform, comprising: an imaging device for image acquisition mounted to the mobile platform; and one or more processors configured for controlling the imaging device according to allowed positions of one or more components of the mobile platform that do not obstruct a field-of-view of the imaging device.

In accordance with another aspect disclosed herein, there is set forth a mobile platform, comprising: an imaging device for image acquisition mounted to the mobile platform; and one or more processors configured for controlling the mobile platform according to a threshold angle of the imaging device relative to the mobile platform that avoids obstruction of the field-of-view of the imaging device by one or more components of the mobile platform.

In accordance with another aspect disclosed herein, there is set forth a system, comprising: a mobile platform having an imaging device mounted thereto for image acquisition; and a controller for controlling the mobile platform, wherein the controller comprises one or more processors configured for controlling the imaging device according to allowed positions of one or more components of the mobile platform that do not obstruct a field-of-view of the imaging device.

In accordance with another aspect disclosed herein, there is set forth a system, comprising: a mobile platform having an imaging device mounted thereto for image acquisition; and a controller for controlling the mobile platform according to a threshold angle of the imaging device relative to the mobile platform that avoids obstruction of the field-of-view of the imaging device by one or more components of the mobile platform.

In accordance with another aspect disclosed herein, there is set forth an apparatus, comprising: one or more processors configured for: exposing an imaging device mounted aboard the mobile platform at a plurality of positions of one or more components of the mobile platform to obtain images; and determining, using the images, allowed positions of the components that do not obstruct a field-of-view of the imaging device.

In accordance with another aspect disclosed herein, there is set forth an apparatus, comprising: one or more processors configured for determining a threshold angle relative to the mobile platform of an imaging device mounted to the mobile platform that avoids obstruction of the field-of-view of the imaging device by one or more components of the mobile platform.

In accordance with another aspect disclosed herein, there is set forth a non-transitory computer-readable medium with instructions stored thereon that, when executed by a processor, perform the steps comprising: exposing an imaging device mounted aboard a mobile platform at a plurality of positions of one or more components of the mobile platform to obtain images; determining, using the images, allowed positions of the components that do not obstruct a field-of-view of the imaging device; and controlling the imaging device according to the allowed positions to avoid imaging the components.

In accordance with another aspect disclosed herein, there is set forth a non-transitory computer-readable medium with instructions stored thereon that, when executed by a processor, perform the steps comprising: determining a threshold angle relative to a mobile platform of an imaging device mounted to the mobile platform that avoids obstruction of the field-of-view of the imaging device by one or more components of the mobile platform; and controlling the mobile platform according to the threshold angle.

Figure 1:
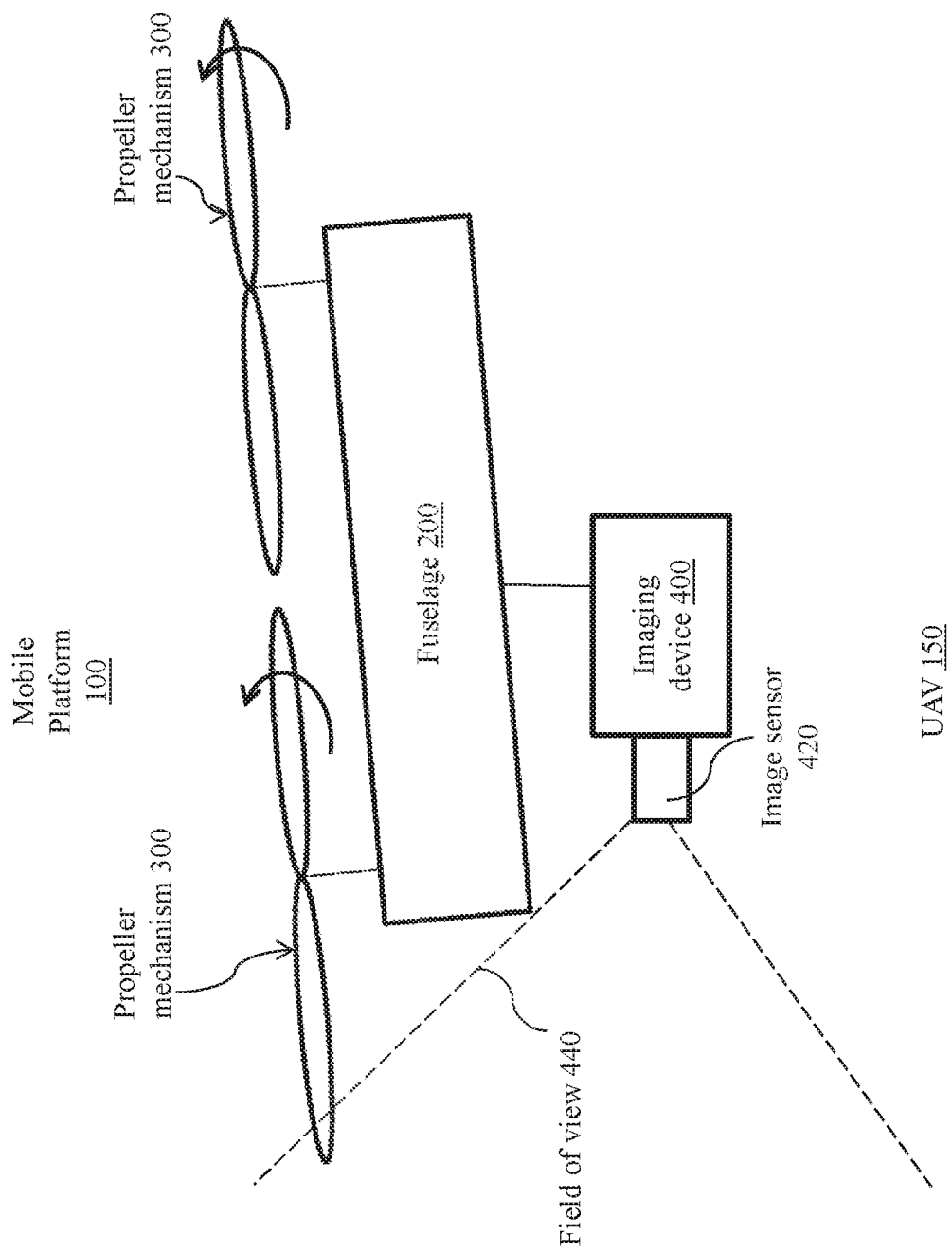
FIG. 1 is an exemplary top-level diagram illustrating an embodiment of a mobile platform having an imaging device and propellers for performing the methods described herein.

It should be noted that the figures are not drawn to scale and that elements of similar structures or functions are generally represented by like reference numerals for illustrative purposes throughout the figures. It also should be noted that the figures are only intended to facilitate the description of the embodiments. The figures do not illustrate every aspect of the described embodiments and do not limit the scope of the present disclosure.

DETAILED DESCRIPTION OF THE EMBODIMENTS

The present systems and methods improve imaging aboard a mobile platform, such as a UAV, by reducing interference by components of the mobile platform in images captured by an imaging device aboard the mobile platform. In particular, the present systems and methods can reduce imaging interference by propellers of the mobile platform, allowing high quality imaging at a wider range of viewing angles of the imaging device.

Suitable mobile platforms for the present systems and methods include, but are not limited to, bicycles, automobiles, trucks, ships, boats, trains, helicopters, aircraft, robotic devices, various hybrids thereof, and the like. In examples provided herein, the present systems and methods are shown using a mobile platform that is a UAV for illustrative purposes only. However, the present systems and methods are suitable for any mobile platform and are not limited to UAVs.

Turning now to FIG. 1, an exemplary mobile platform 100 is shown as a UAV 150. Colloquially referred to as a "drone," a UAV 150 is an aircraft without a human pilot (or operator) onboard the vehicle that is controlled autonomously or by a remote pilot (or sometimes both). UAVs 150 are now finding increased usage in civilian applications involving various aerial operations, such as data-gathering or delivery. The present systems and methods are suitable for many types of UAVs 150 including, without limitation, quadcopters (also referred to a quadrotor helicopters or quad rotors), single rotor, dual rotor, trirotor, hexarotor, and octorotor rotorcraft UAVs 150, and hybrid rotorcraft-fixed wing UAVs 150.

As shown in FIG. 1, the UAV 150 can include one or more propeller mechanisms 300 for propelling the UAV 150. Each of the propeller mechanisms 300 can be attached to a fuselage 200 of the UAV 150. The number and positioning of the propeller mechanisms 300 can vary depending on the design of the UAV 150. For example, the UAV 150 can have one, two, three, four, five, six, eight, ten, twelve, or more separate propeller mechanisms 300. The propeller mechanisms 300 can be mounted on any suitable portion of the mobile platform 100, such on the top, bottom, front, back, sides, or suitable combinations thereof. In some embodiments, the propeller mechanisms 300 can be situated on a top side of the UAV 150, as shown in FIG. 1. The propeller mechanisms 300 can be arranged to provide balanced lift and/or propulsive forces for the UAV 150. In some embodiments, the propeller mechanisms 300 can be arranged in a regular polygonal pattern (for example, as an equilateral triangle, square, hexagon, or octagon pattern).

FIG. 1 further illustrates an exemplary imaging device 400 that is mounted to the fuselage 200 of the UAV 150. The imaging device 400 and the propeller mechanism 300 can be installed in any manner relative to each other. For example, as shown in FIG. 1, the imaging device 400 and the propeller mechanism 300 installed on opposite sides of the fuselage 200. Exemplary imaging devices 400 suitable for use with the present systems and methods, include, but are not limited to, commercially-available cameras and camcorders. The imaging device 400 is depicted as have a field-of-view 440, as indicated by dashed lines in FIG. 1. The field-of-view 440 is shown to capture a portion of the propeller mechanism 300. This obstruction of the field-of-view is by components of the mobile platform 100 is addressed by the present systems and methods.

The imaging device 400 can include an image sensor 420 for sensing light and converting the sensed light into electrical signals that can be rendered as an image. Suitable image sensors 420 can include analog sensors (for example, video camera tubes) and/or digital sensors (for example, charge-coupled device (CCD), complementary metal-oxide-semiconductor (CMOS), N-type metal-oxide-semiconductor (NMOS) sensors, and hybrids/variants thereof). Digital image sensors 420, for example, can include a two-dimensional array of photosensor elements (not shown) that can each capture one pixel of image information. In some embodiments, the image sensor 420 has a resolution of at least 0.1 Megapixels, 0.5 Megapixels, 1 Megapixel, 2 Megapixels, 5 Megapixels, 10 Megapixels, 20 Megapixels, 50 Megapixels, 100 Megapixels, or an even greater number of pixels.

In some embodiments, the image sensor 420 can be a global shutter image sensor 420 that can expose all pixels of the image at the same time. In other embodiments, the image sensor 420 can be a rolling shutter image sensor 420 that can capture a portion of the pixels of the image at any given time. For example, a rolling shutter image sensor 420 can expose one or more rows (or columns) of pixels at each instant of exposure. The rows (or columns) of pixels obtained via a plurality of exposures can form a full image.

The imaging device 400 can also include a lens (not shown) for focusing light onto the photosensor elements, such as a digital single-lens reflex (DSLR) lens, pin-hole lens, biological lens, simple convex glass lens, macro lens, zoom lens, telephoto lens, fisheye lens, wide-angle lens, or the like. The imaging device 400 can also include apparatus (not shown) that separates and/or filters the sensed light based on color and directs the light onto the appropriate photosensor elements. The imaging device 400 can have specialty functions for use in various applications such as thermography, creation of multi-spectral images, infrared detection, gamma detection, x-ray detection, and the like. The imaging device 400 can include, for example, electro-optical sensors, thermal/infrared sensors, color or monochrome sensors, multi-spectral imaging sensors, spectrophotometers, spectrometers, thermometers, and/or illuminometers.

Figure 2:
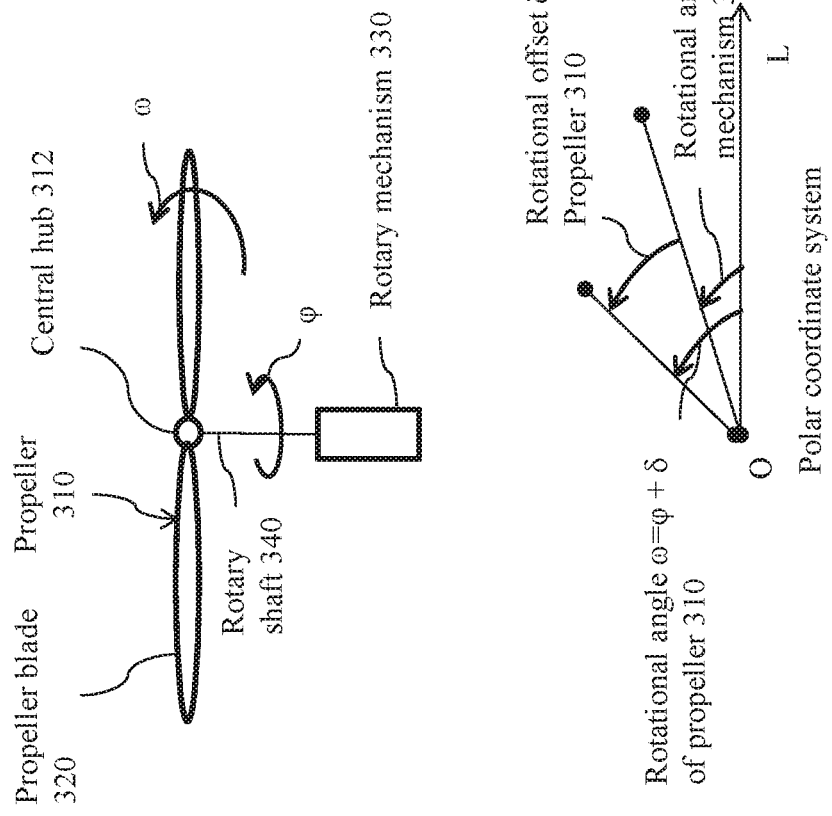
FIG. 2 is an exemplary diagram illustrating an embodiment of a propeller mechanism of the mobile platform of FIG. 1.

Turning to FIG. 2, an exemplary propeller mechanism 300 is shown as including a propeller 310 that can rotate about a rotary shaft 340 to generate force for propelling the UAV 150. For example, the UAV 150 can have multiple horizontally oriented propeller mechanisms 300 that can provide lift and/or thrust to the UAV 150. Multiple horizontally propeller mechanisms 300 can be actuated to provide vertical takeoff, vertical landing, and/or hovering capabilities to the UAV 150. In some embodiments, the propeller mechanisms 300, individually or in combination, can advantageously control a pitch angle or tilt angle of the UAV 150 during flight to avoid components of the UAV 150 obstructing a field-of-view of an imaging device mounted aboard the UAV 150.

The propeller mechanisms 300 can be configured to spin clockwise or counterclockwise, as desired. In some embodiments, one or more of the propeller mechanisms 300 can spin in a clockwise direction, while one or more of the other propeller mechanisms 300 can spin in a counterclockwise direction. Configuring different propeller mechanisms 300 to spin in different directions can advantageously provide balance and stability to the UAV 150 during flight. In some embodiments, the number of clockwise propeller mechanisms 300 can be equal to the number of counterclockwise propeller mechanisms 300. The rotation rate of each of the propeller mechanisms 300 can be varied independently in order to control the lift and/or thrust provided to the UAV 150, thereby control the spatial position, velocity, and/or acceleration of the UAV 150. Alternatively, the rotation rates of the propeller mechanisms 300 can be controlled to be the same.

As shown in FIG. 2, the propeller 310 can include one or more propeller blades 320 radiating from the rotary shaft 340. In some embodiments, when the propeller 310 includes multiple propeller blades 320, the propeller blades 320 can be arranged in a symmetric angular distribution about the rotary shaft 340. Optionally, the propeller 310 can include a central hub 312 for attaching the propeller blades 320.

The propeller 310 can be coupled to a rotary mechanism 330 directly, and/or, as illustrated in FIG. 2, via the rotary shaft 340. The rotary shaft 340 can be coupled to the propeller 310 via the central hub 312. When the rotary mechanism 330 actuates a rotation of the rotary shaft 340, the propeller 310 can rotate with the rotary shaft 340 accordingly. Stated somewhat differently, the propeller 310 can be rotationally coupled with respect to the rotary mechanism 330.

The rotary mechanism 330 can include any mechanism for moving and/or controlling the propeller. An exemplary rotary mechanism 330 can include a motor and/or actuator. For example, the rotary mechanism 330 can include a multi-phase brushless direct current (BLDC) motor, a single-phase brushless motor, a brushed motor, an alternating current (AC) induction motor, a permanent magnet synchronous motor, a stepper motor, a switched reluctance motor, or any combination thereof. In some embodiments, the rotary mechanism 330 can advantageously be installed within the fuselage 200, as shown in FIG. 1, for protection against wear and tear.

A rotational angle (or rotational phase) $\varphi$ of the rotary mechanism 330 is shown in FIG. 2 with respect to an arbitrary origin O and a polar axis L. The rotational angle $\varphi$ is shown in a polar coordinate system that is parallel to a plane of rotation of the rotary mechanism 330 and/or the propeller 310. In various embodiments, the rotational angle φ of the rotary mechanism 330 can be controlled, for example, by a controller 220 (shown in FIG. 3).

FIG. 2 further shows a rotational angle ω of the propeller 310 in the polar coordinate system as having a positional offset δ relative to the rotational position φ of the rotary mechanism 330. The rotational positions ω of one or more propellers 310 of the propeller mechanism 300 can be determined based on the rotational position φ of the rotary mechanism 330 and the rotational offset δ. For example, as shown in FIG. 2, the rotational position ω can be found as δ+φ.

In some embodiments, the rotational offset δ is fixed by coupling of the propeller 310 to the rotary shaft 340 and/or the rotary mechanism 330. For example, the propeller 310 can be rotationally coupled with the rotary shaft 340 via welding and/or a mechanical connection such as a protrusion fitted into a complementary recess. Any combination of mating elements, such as blocks, tabs, pockets, slots, ramps, locking pins, support pins, and the like, may be selectively or automatically engaged and/or disengaged to couple or decouple the propeller 310 to the rotary shaft 340 and/or the rotary mechanism.

Figure 3:
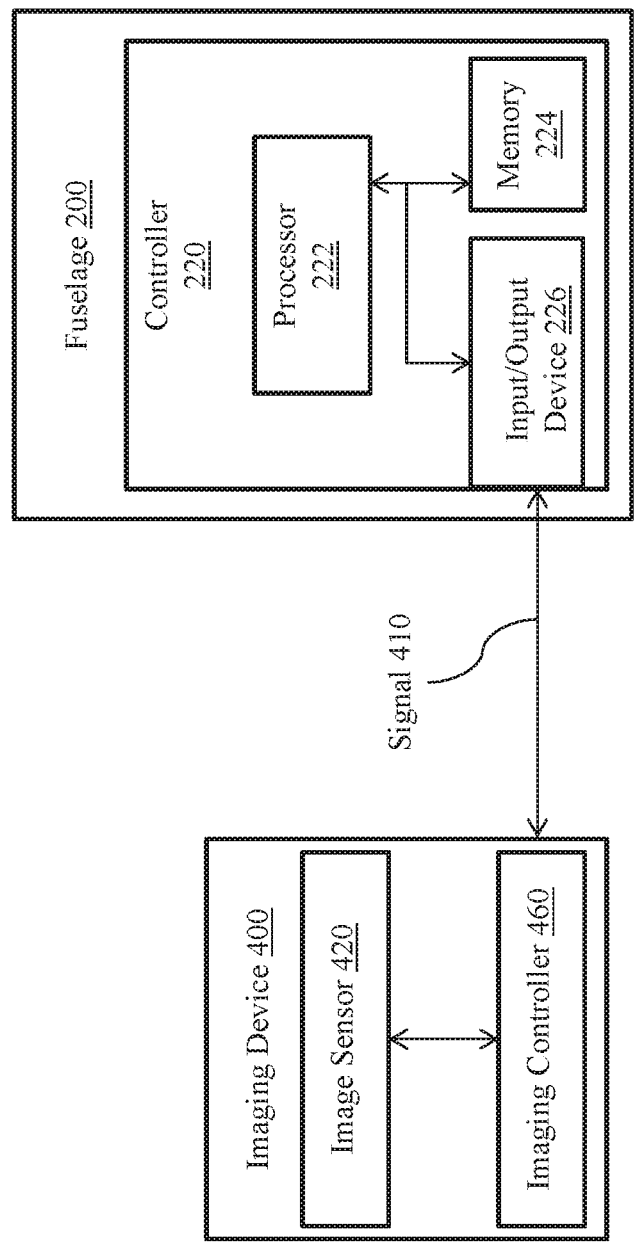
FIG. 3 is an exemplary diagram illustrating an embodiment of the mobile platform of FIG. 1, wherein a signal can be transmitted from a controller of the mobile platform to an imaging device to trigger exposure of the imaging device.

Turning now to FIG. 3, an exemplary mobile platform 100 is shown to include a controller 220 for generating one or more control signals for operating the mobile platform 100. The controller 220 can be installed anywhere aboard the mobile platform 100. As illustrated in FIG. 3, the controller 220 can advantageously be installed within the fuselage 200 of the mobile platform 100 for protection against wear and tear.

FIG. 3 shows the controller 220 as including a processor 222. The processor 222 can include one or more general-purpose microprocessors (for example, single or multi-core processors), application-specific integrated circuits, application-specific instruction-set processors, graphics processing units, physics processing units, digital signal processing units, coprocessors, network processing units, encryption processing units, and the like. Although a single processor 222 is shown in FIG. 3 for illustrative purposes only, the controller 220 can include any number of uniform and/or different processors 222.

The controller 220 can include one or more additional hardware components and/or software for performing the mobile platform control functions and operations described herein. Exemplary additional hardware components include, but are not limited to, a memory 224, alternatively referred to herein as a non-transitory computer-readable storage medium. The memory 224 can include any computer-readable storage medium for storing machine-executable code. Exemplary memories 224 can include a random access memory (RAM), static RAM, dynamic RAM, read-only memory (ROM), programmable ROM, erasable programmable ROM, electrically erasable programmable ROM, flash memory, secure digital (SD) card, magnetic disk, optical disk, etc. Instructions for execution by the processor 222 can be stored on the memory 224 as a computer program product. The processor 222 and the memory 224 can be provided in an integrated and/or discrete manner. Although one memory 224 is shown in FIG. 3 for illustrative purposes only, the controller 220 can include any number of uniform and/or different memories 224.

As shown in FIG. 3, the controller 220 can include at least one input/output device 226. Exemplary input/output devices 226 can include, but are not limited to, universal serial bus (USB), digital visual interface (DVI), display port, serial ATA (SATA), IEEE 1394 interface (also known as FireWire), serial, video graphics array (VGA), super video graphics array (SVGA), small computer system interface (SCSI), high-definition multimedia interface (HDMI), audio ports, and/or proprietary input/output interfaces. The controller 220 can communicate with the imaging device 400 via the input/output device 226.

FIG. 3 further shows the imaging device 400 as including an imaging controller 460 coupled with the image sensor 420 to control exposure of the image sensor 420. The imaging controller 460 can include a processor (not shown) coupled with a memory (not shown) and/or an input/output device (not shown). The processor, the memory and the input/output device can be provided as in the manner set forth above with reference to the processor 222, the memory 224 and the input/output interface 226, respectively. Although FIG. 3 shows the controller 220 and the imaging controller 460 as being separate units for illustrative purposes only, the controller 220 and the imaging controller 460 can be at least partially or fully integrated.

As shown in FIG. 3, the controller 220 can be configured to transmit a signal 410 to the imaging device 400. The imaging controller 460 can control, for example, exposure of the image sensor 420 based on the signal 410. For example, the signal 410 can be an exposure signal 412 (shown in FIG. 8) that triggers an exposure of the image sensor. The image sensor can automatically cease exposure upon sufficient exposure, as desired. Alternatively, the image sensor commence exposure upon receipt of the exposure signal 412, and can continue exposure until receipt of a de-exposure signal 414 (shown in FIG. 9). In some embodiments, the imaging device 400 can transmit a signal 410 to the controller 220 (for example, a signal concerning a status of the imaging device 400, such as completion of one frame of exposure).

Figure 4:
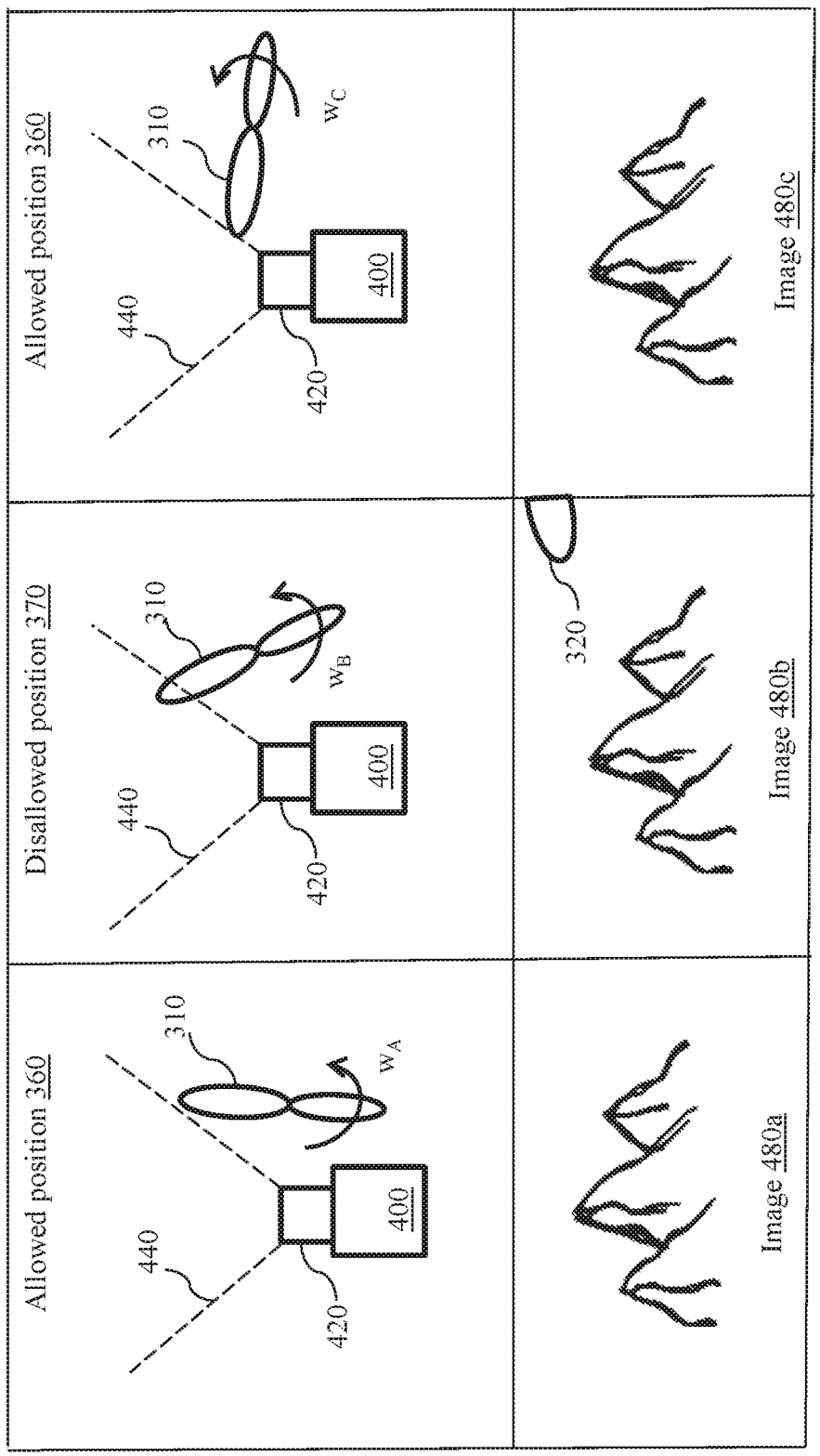
FIG. 4 is an exemplary diagram illustrating another embodiment of the mobile platform of FIG. 1, wherein a propeller of the mobile platform is shown to move between allowed and disallowed positions.

Turning now to FIG. 4, a top view of a propeller 310 is shown at different rotational positions ω in relation to the imaging device 400. At rotational position $\omega_A$, the propeller 310 has not entered the field-of-view 440. In other words, the propeller 310 does not obstruct the field-of-view 440. With a rotation of the propeller 310 in a counter-clockwise direction, at rotational position $\omega_B$, the propeller 310 enters and obstructs the field-of-view 440. With further rotation of the propeller 310, at rotational position $\omega_C$, the propeller 310 exits and no longer obstructs the field-of-view 440.

The image sensor 420 can capture images 480 at one or more rotational positions of the propeller 310. As shown in FIG. 4, the image sensor 420 captures images 480a, 480b, and 480c at rotational positions $\omega_A$, $\omega_B$, $\omega_C$, respectively. In images 480a, 480c at rotational position $\omega_A$ and rotational position $\omega_C$, no propeller blades 320 of the propeller 310 are visible. Therefore, rotational positions $\omega_A$, $\omega_C$ are deemed allowed positions 360. Stated somewhat differently, at each of rotational positions $\omega_A$ or $\omega_C$, the propeller 310 is in an allowed position 360. In image 480b at rotational position $\omega_B$, a propeller blade 320 of the propeller 310 is at least partially visible. Therefore, rotational position $\omega_B$ is a not an allowed position 360. Stated somewhat differently, rotational position $\omega_B$ is a disallowed position 370.

Figure 5:
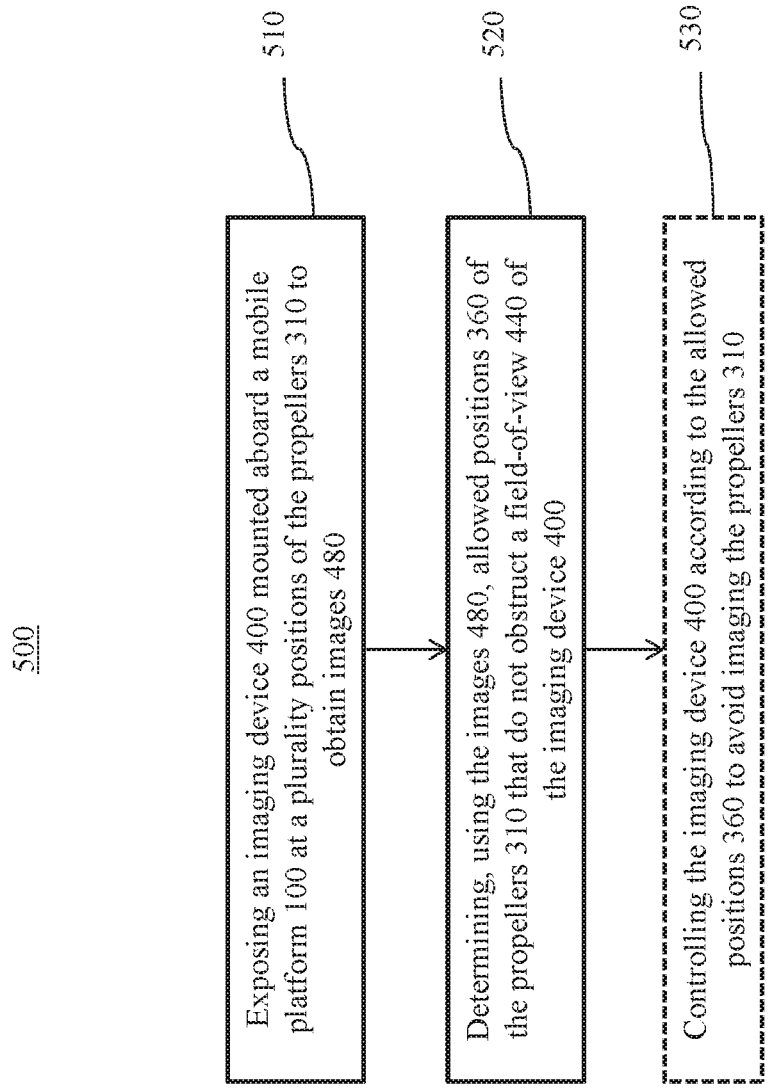
FIG. 5 is an exemplary top-level flow chart illustrating an embodiment of a method for imaging on the mobile platform of FIG. 1.

Turning now to FIG. 5, an exemplary method 500 is shown for imaging on a mobile platform 100. Although certain embodiments of the present systems and methods are shown with respect to propellers 310 of the mobile platform 100 for illustrative purposes only, the present system and methods are not limited to propellers 310. The present system and methods can be used to avoid obstruction by any components of the mobile platform 100.

At 510, the imaging device 400 can be exposed at a plurality of positions of the components of the mobile platform to obtain images 480. For example, the imaging device 400 can be exposed at a plurality of rotational positions ω of each propeller 310 to obtain the images 480. In one embodiment, the imaging device 400 can be exposed as the propellers 310 are stationary. For example, each propeller 310 can be manually adjusted to a plurality of rotational positions ω, and the imaging device 400 can be exposed to yield a image 480 after each manual adjustment. The imaging device 400 can be exposed at a set of rotational positions ω that cover a full range of rotation of the propeller 310 (for example, over 360 degrees). The imaging device 400 can be exposed once every one degree, two degrees, five degrees, ten degrees, fifteen degrees, twenty degrees, thirty degrees, forty-five degrees, sixty degrees, etc. At each rotational position ω, exposure of the imaging device 400 can be triggered based on an exposure signal 412. Additionally and/or alternatively, the exposure of the imaging device 400 can be triggered by manually operating the imaging device 400.

Alternatively and/or additionally, the imaging device 400 can be exposed as the propellers 310 are rotating. The propellers 310 can rotate at any rotational speed during the exposing. For example, the imaging device 400 can sample the rotational positions ω of the propeller 310 at regular intervals, or at random. Sampling enables exposure of the imaging device 400 the rotational positions ω cover a full range of rotation of the propeller 310 (for example, over 360 degrees).

In some embodiments, imaging device 400 can be exposed at multiple rotational speeds of the propeller 310, allowing acquisition of a set of images 480 corresponding to each of the rotational speeds at which the imaging device 400 is exposed. Based on these sets of images 480, allowed positions 360 can be determined for each of the rotational speeds. The allowed positions 360 for each of the rotational speeds can be used to control the imaging device 400 during operation of the mobile platform 100 based on the operating rotational speeds of the propeller mechanism 300.

Generally, the allowed positions 360 for a particular propeller mechanism 300 with respect to a particular position of the imaging device 400 can be independent of the rotational speed at which the allowed positions 360 are obtained. However, in some cases, the allowed positions 360 can differ across different rotational speeds of the propeller mechanism 300 based on measurement error or other factors. Accordingly, the allowed positions 360 referenced during control of the imaging device 400 can advantageously be matched to a particular set of allowed positions 360 according to the rotational speed. For example, allowed positions 360 for a propeller mechanism 300 can be determined for each of the rotational speeds 1000 rpm (rotations per minutes), 1500 rpm, 2000 rpm, 2500 rpm, and 3000 rpm. Subsequently, a propeller mechanism 300 operating at 2500 rpm during flight can reference the allowed positions 360 acquired at 2500 rpm. If a set of allowed positions 360 corresponding to the operational rotational speed are not available, a set of allowed positions 360 corresponding to a nearest rotational speed can be used. Following the example above, a propeller mechanism 300 operating at 2550 rpm (rotations per minute) during flight can reference the allowed positions 360 acquired at 2500 rpm.

At 520, allowed positions 360 of the components of the mobile platform 100 that do not obstruct a field-of-view 440 of the imaging device 400 can be determined using the images 480. For example, allowed positions 360 of propellers 310 that do not obstruct the field-of-view 440 can be determined using the images 480. In some embodiments, one or more images 480 in which the propeller blades 320 (or other portions) of the propeller 310 do not obstruct the field-of-view 440 of the imaging device 400 can be selected. Stated somewhat differently, images 480 in which the propeller blades 320 are not visible can be selected. In one embodiment, the images 480 can be selected manually. For example, an operator can review and/or analyze the images 480 visually and/or using any image analysis tools to determine whether the propeller blades 320 are visible in each of the images 480.

Alternatively, and/or additionally, the images 480 can be selected automatically. For example, a computer system can perform one or more image feature recognition (and/or feature detection) methods to detect the propeller blades 320 in the images 480. Exemplary feature recognition methods can include edge detection, and/or image binarization. The computer system can include any local and/or remote system. For example, the computer system can include the controller 220 and/or the imaging controller 460 shown in FIG. 3.

In some embodiments, a pattern can be provided on the propeller blades 320, for example, by printing, inscription, labeling, or other patterning technique. By recognition of the pattern on the propeller blades 320, propeller blades 320 in the images 480 can be determined quickly and accurately. The pattern can be of any type of pattern that is recognizable using the image feature recognition methods. An exemplary pattern can include a high contrast pattern. For example, the propeller blades 320 can have a checkerboard pattern, a striped pattern with alternating light and dark stripes, and the like.

After images 480 that do not include interfering material are selected, rotational positions ω of the propellers 310 that correspond to these images 480 can be determined to be the allowed positions 360. The allowed positions 360 can be transferred to a memory 224 for ease of access during operation of the mobile platform 100. Alternatively, and or additionally, the allowed positions 360 can be kept on a memory of an external system (such as a control device) and transmitted to the mobile platform 100 as needed.

In some embodiments, the exposing and determining steps at 510 and 520 can be carried on an apparatus separate from the mobile platform 100. The apparatus can be, for example, a user terminal (not shown). The user terminal can be configured to interact with a user (not shown) to operate the mobile platform and/or present data collected by the mobile platform 100 to the user. The user terminal can include, for example, remote controllers (not shown), portable computers, laptops, mobile devices, handheld devices, mobile telephones (for example, smartphones), tablet devices, tablet computers, personal digital assistants, handheld consoles, portable media players, wearable devices (for example, smartwatches and head-mounted displays), and the like. The apparatus can have one or more processors configured to carry out any of the methods described herein. Suitable processors are described above with reference to a processor 222 of the mobile platform 100 in FIG. 3. In some embodiments, data (such as allowed positions of propellers) can be transmitted from the apparatus to the mobile platform 100 as needed.

Optionally, at 530, the imaging device 400 can be controlled according to the allowed positions 360 to avoid imaging the components of the mobile platform 100. In some embodiments, the imaging device 400 can be controlled according to the allowed positions 360 to avoid imaging the propellers 310. For example, the controller 220 shown in FIG. 3 can trigger and/or stop exposure of the imaging device 400 based on the rotational position of the propeller 310. The controller 220 can trigger and/or stop exposure of the imaging device 400 in a global shutter and/or rolling shutter imaging device, without limitation. For example, for a rolling shutter imaging device, the controller 220 can trigger exposure of the imaging device 400 to capture one or more rows or columns of pixels of an image, stop the exposure upon passage of a propeller blade 320 through the field-of-view 440, and then trigger exposure of the imaging device 400 to capture more rows or columns of pixels of the image. Each portion of the image can be captured at the allowed rotational positions 360, so that the entire image excludes the propeller blades 320.

Using the method 500, interference from propellers in images acquired by the imaging device 400 can be reduced or eliminated. Advantageously, such improvement does not require changing an installation position of the imaging device 400 aboard the mobile platform 100. The center of mass of the mobile platform 100 is thus not affected, and control algorithms and power systems of the mobile platform 100 not need be modified. Further, the range of viewing angles of the imaging device 400 aboard the mobile platform need not be limited or constrained, allowing the functionality of the imaging device 400 to be fully utilized.

Figure 6:
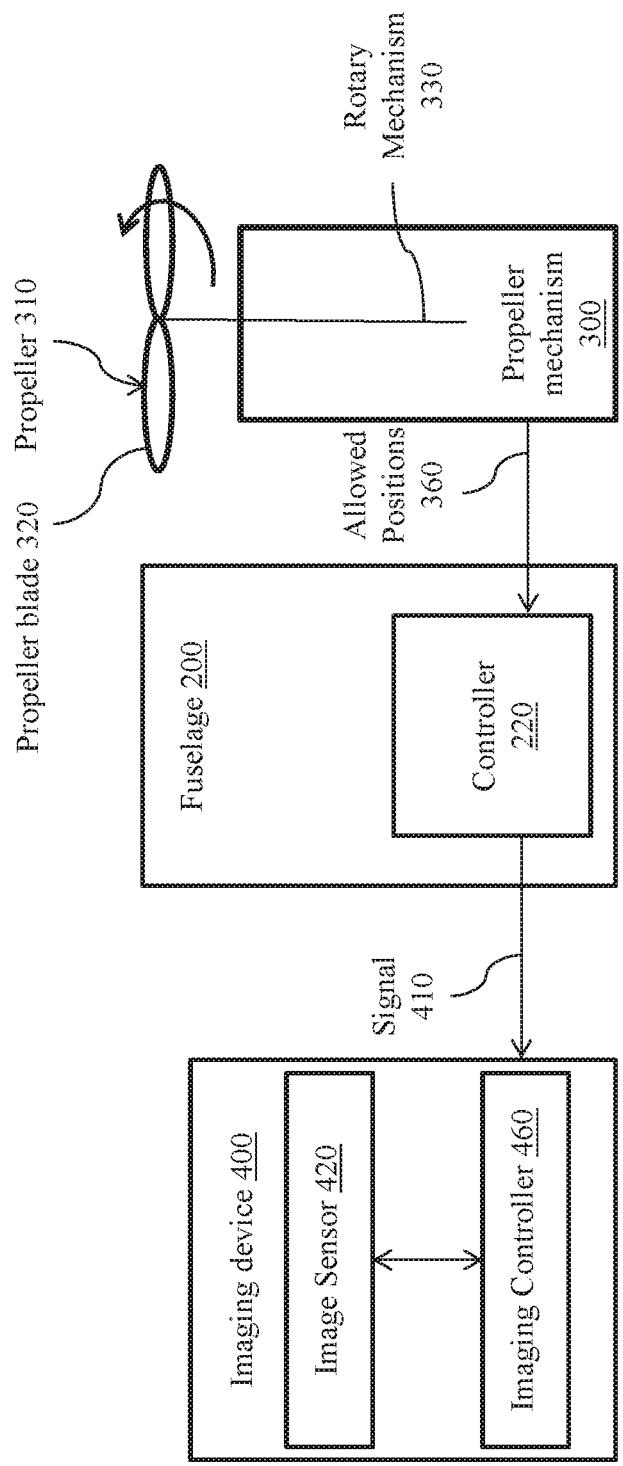
FIG. 6 is an exemplary diagram illustrating another embodiment of the mobile platform of FIG. 1, wherein exposure of the imaging device is controlled according to allowed positions of the propeller.

Turning now to FIG. 6, another exemplary mobile platform 100 is shown for illustrating controlling the imaging device 400 according to allowed positions 360. During operation of the mobile platform 100, the controller 220 for the mobile platform 100 can ascertain and/or control a rotational position $\varphi$ of a rotary mechanism 330 of the propeller mechanism 300. In some embodiments, the rotary mechanism 330 can transmit a signal 410 indicative of the rotational position $\varphi$ to the controller 220. For example, the rotary mechanism 330 can transmit a signal to the controller 220 indicating that, at time t=0 milliseconds, the rotational position $\varphi$=30 degrees. The controller can determine whether the rotational position $\varphi$=30 degrees is an allowed position 360 or a disallowed position 370, and transmit a signal 410 to the imaging device 400 accordingly.

In some embodiments, the rotary mechanism 330 can further transmit a rotational speed and/or acceleration of the rotary mechanism 330 to facilitate determining the rotational position $\varphi$. For example, rotary mechanism 330 can transmit a signal to the controller 220 indicating that, at time t=0 milliseconds, the rotational position $\varphi$=30 degrees and the rotational speed is 100 rotations per second. The controller 220 can thereby determine rotational position $\varphi$ of the rotary mechanism 330 at future times. For example, at t=1 millisecond, the rotational position $\varphi$ has changed by one-tenth of a rotation, or 36 degrees, and therefore the rotational position can be found to be $\varphi$=66 degrees at t=1 millisecond. In some embodiments, using the rotational speed and/or acceleration of the rotary mechanism 330 can be used to correct timing delays in transmission of the allowed positions 360 to the controller 220, and/or delays in transmission of the signal 410 to the imaging device 400. For example, suppose that there is a latency of 1 millisecond in transmission of the signal 410. The controller 220 can determine that, at the time of receipt of the signal 410 by the imaging device, the rotational position will have already moved from $\varphi$=30 degrees to $\varphi$=66 degrees. The controller 220 can accordingly transmit the signal according to whether $\varphi$=66 degrees is an allowed position 360.

In some embodiments, a sensor (not shown) can be used to determine the rotational position $\varphi$ of the rotary mechanism 330. For example, a Hall effect sensor (including, without limitation, a linear or threshold Hall effect sensor) can be used for detecting the position and/or speed of the rotary mechanism 330 (for example, by sensing changes in a magnetic field caused by the rotating rotary mechanism 330). Other magnetometers such as rotating coil magnetometers, magnetoresistive devices, fluxgate magnetometers, and the like, can be used for sensing the position and/or speed of the rotary mechanism 330. Alternatively, and/or additionally, a potentiometer and/or electronic speed control can be used for sensing the position and/or speed of the rotary mechanism 330.

According to the above, at any instantaneous moment during rotation of the rotary mechanism 330, the rotational position $\varphi$ of the rotary mechanism 330 can be determined. The rotational position $\omega$ of the propeller 310 (and each propeller blade 320) attached to the rotary mechanism 330 can be determined based on the rotational position $\varphi$ of the rotary mechanism 330. For example, where the propeller 310 is operatively coupled to the rotary mechanism 330 based on a relative rotational offset $\delta$ (shown in FIG. 2), the rotational position $\omega$ of the propeller 310 can be determined to be $\omega=\varphi+\delta$. Accordingly, the controller 220 can ascertain and/or control the rotational position of the propeller 310.

After ascertaining the rotational position $\omega$ of the propeller 310, the controller 220 can determine whether the rotational position $\omega$ is an allowed position 360 or, alternatively, is a disallowed position 370. The controller 220 can transmit a signal 410 (for example, an exposure signal 412, shown in FIG. 8) to the imaging device 400 based on the rotational position $\omega$ of the propeller 310 being in an allowed position 360. Alternatively, and/or additionally, the controller 220 can transmit a signal 410 (for example, a de-exposure signal 414, shown in FIG. 9) to the imaging device 400 based on the rotational position $\omega$ of the propeller 310 being in a disallowed position 370. Upon receipt of the signal 410, the imaging controller 460 can trigger an exposure or de-exposure of the image sensor 420, as desired.

In some embodiments, the controller 220 can transmit the signal 410 over a wired connection. For example, the controller 220 can be connected with the imaging device 400 using a serial port and/or a parallel port to form the wired connection. Signaling over the wired connection can advantageously reduce latency between transmission of the signal 410 by the controller 220 and receipt of the signal 410 by the imaging device 400. Such reduction in latency can, for example prevent "late" exposure signals that could result in incomplete removal of propeller blades 320 from acquired images. In some embodiments, the controller 220 can transmit the signal 410 wirelessly. Exemplary wireless methods can include radio, Wireless Fidelity (WiFi), cellular, satellite, Bluetooth, near field communication (NFC), broadcasting and/or any other communication methods described above with reference to FIG. 3.

Figure 7:
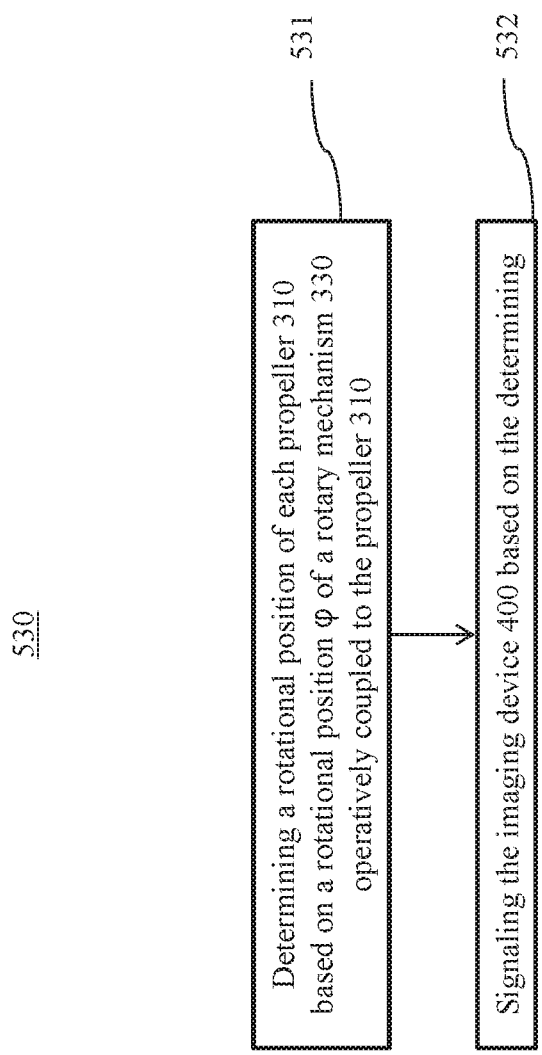
FIG. 7 is an exemplary flow chart illustrating an embodiment of the method of FIG. 5, wherein exposure of the imaging device is controlled according to allowed positions of the propeller.

Turning now to FIG. 7, the controlling step 530 of the method 500 is shown in greater particularity in an exemplary embodiment of the method 500. At 531, a rotational position $\omega$ of a propeller 310 can be determined based on the rotational position $\omega$ of the rotary mechanism 330 operatively coupled to the propeller 310. For example, the controller 220 shown in FIG. 6 can determine the rotational position $\omega$ of the rotary mechanism 330 to determine the rotational position $\omega$ of the propeller 310. In some embodiments in which the propeller 310 is rotationally coupled with respect to the rotary mechanism 330, determining the rotational position $\omega$ of the propeller 310 can be based on a rotational offset $\delta$ relative to the rotational position $\varphi$ of the rotary mechanism 330. That is, the rotational position $\omega$ of the propeller 310 can be determined to be $\omega=\varphi+\delta$.

At 532, the signal 410 can be transmitted to the imaging device 400 based on the determining of 531. In some embodiments, the signally can include transmitting an exposure signal 412 to trigger exposure of the imaging device 400 when the propeller 310 is in an allowed positions 360. Although FIG. 7 shows the signal 410 as being transmitted to trigger exposure of the imaging device 400 for illustrative purposes only, the signal 410 can be transmitted to control exposure of the imaging device 400 in any manner. For example, the signal 410 can be transmitted to prohibit exposure of the imaging device 400 when the propeller 310 is not in any of the allowed positions 360, or when the propeller 310 is in a disallowed position 370.

Figure 8:
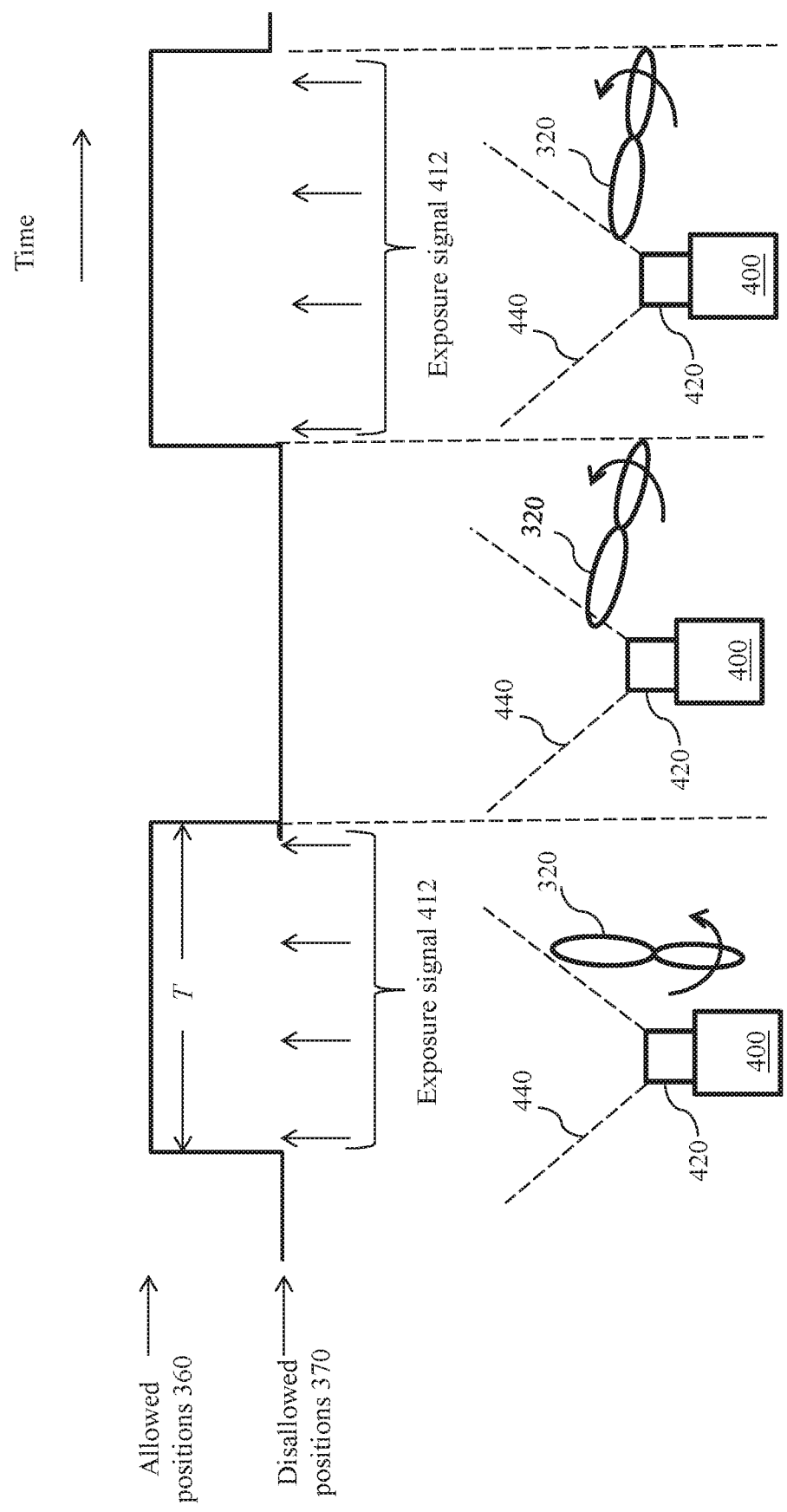
FIG. 8 is an exemplary diagram illustrating allowed and disallowed positions of a propeller over time, and showing signaling of the imaging device based on rotational positions determined for the propeller.

Turning to FIG. 8, an exemplary position-time diagram 800 illustrates a method of controlling exposure of the imaging device 300 during operation of the propeller 310. A waveform shown in the position-time diagram 800 depicts transitions between allowed rotational positions 360 and disallowed rotational positions 370 as a function of time. As shown in FIG. 8, when the propeller 310 is in one or more of the allowed rotational positions 360, an exposure signal 412 can be transmitted to the imaging device 400.

As shown in FIG. 8, transmitting of the exposure signal 412 can begin when the propeller 310 enters the field-of-view 440 of the image sensor 420. Transmitting of the exposure signal 412 can stop when the propeller 310 exits the field-of-view 440 of the image sensor 420. In other words, when the propeller 310 is in the allowed rotational positions 360 within a time duration T, the exposure signal 412 can be repeatedly transmitted during the time duration T. The time duration T can be alternatively referred to herein as an exposure time T. The exposure signal 412 can be transmitted within the exposure time T at any fixed and/or variable frequency, without limitation.

In some embodiments, the exposure signal 412 can be transmitted once per exposure desired by the imaging device 300. For example, in a rolling shutter imaging device 300, each exposure signal 412 can trigger exposure of one row or column of the imaging device 300. In other embodiments, the exposure signal 412 can be repeatedly transmitted to the imaging device 300 as long as the propellers 310 remain in an allowed position 360. For example, the imaging device 300 can be configured to continuously expose as repeated exposure signals 412 are received. In various embodiments, the controller 220 shown in FIG. 6 can send the exposure signal 412 to the imaging device 400.

Figure 9:
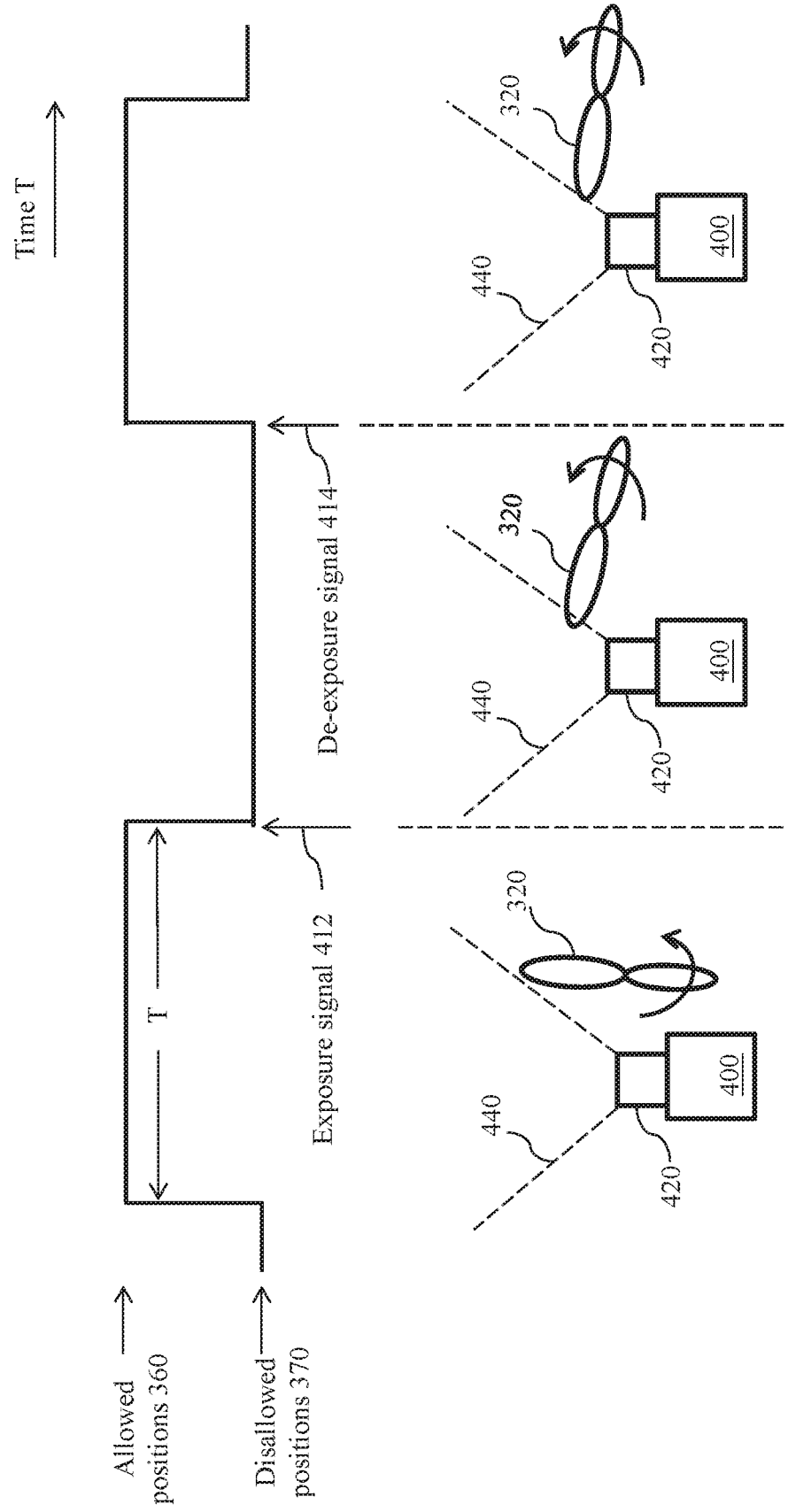
FIG. 9 is another exemplary diagram illustrating allowed and disallowed positions of a propeller over time, and showing another signaling of the imaging device based on rotational positions determined for the propeller.

Turning to FIG. 9, another exemplary position-time diagram 900 is shown as illustrating a method of controlling exposure of the imaging device 300 during operation of the propeller 310. As shown in FIG. 9, the exposure signal 412 can be transmitted to the imaging device 400 when the propeller 310 moves from a disallowed position 370 to an allowed position 360 of the propeller 310. In various embodiments, the controller 220 shown in FIG. 6 can send the exposure signal 412 to the imaging device 400. The exposure signal 412 can inform the imaging device 400 that exposure can be started. A de-exposure signal 414 can be transmitted to the imaging device 400 when the propeller 310 moves from an allowed position 360 to a disallowed position 370 of the propeller 310. In various embodiments, the controller 220 shown in FIG. 6 can send the de-exposure signal 414 to the imaging device 400. The de-exposure signal 414 can inform the imaging device 400 that exposure is to stop.

In some embodiments, the exposure time T shown (as shown, for example, in FIGS. 8 and 9) can be limited according to a rotational speed and number of propeller blades 320 of each propeller 310. For example, when the rotational speed of the propeller 310 is increased, the exposure time T can be decreased. Additionally and/or alternatively, when the number of propeller blades 320 of the propeller 310 is increased, the exposure time T can be decreased. The signal time diagram 900 can be based on the propeller 310 with a single propeller blade 320. For a propeller 310 with a number N of propeller blades 320 arranged in even angular distribution, the exposure time T is divided by the number N. For example, suppose that an exemplary propeller 310 rotates at a rate of 3000 rpm (or 50 rotations per second), corresponding to a rotational speed of one revolution every 20 milliseconds. For a propeller 310 having N=2 propeller blades 320 symmetrically spaced 180 degrees apart, the time interval between passage of successive blades can be found to be 10 milliseconds. Accordingly, the exposure time T can be limited to 10 milliseconds, if desired. During operation of the imaging device 300, the limit on the exposure time T can be determined according to the instantaneous rotational speed of the propeller 310. The exposure time T of the imaging device 300 can be limited accordingly, as desired.

Figure 10:
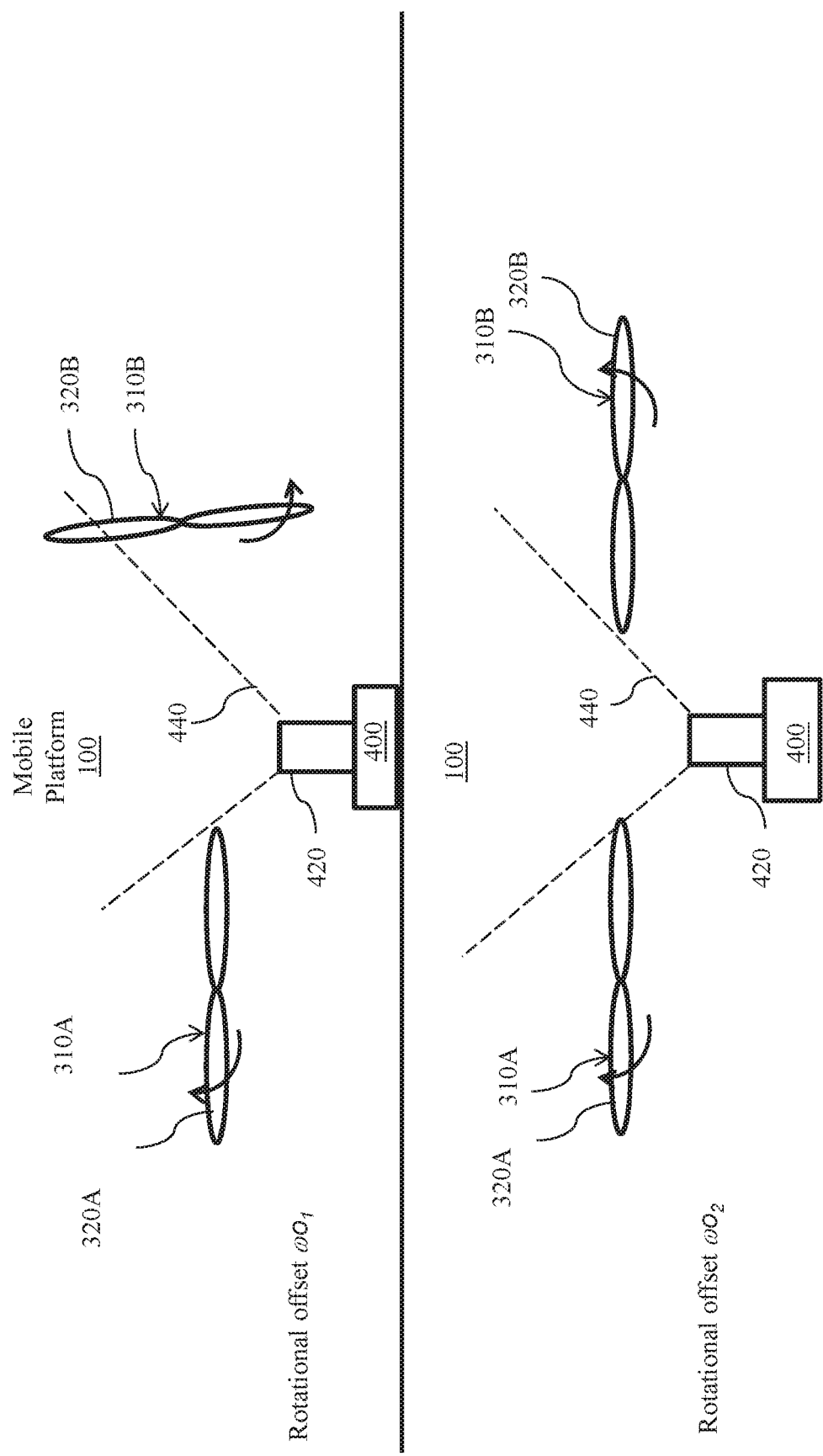
FIG. 10 is an exemplary diagram illustrating a rotational offset between two propellers of the mobile platform and potential interference caused by incorrect phasing between the two propellers.

Turning to FIG. 10, an exemplary mobile platform 100 is show as including a first propeller 310A and a second propeller 310B. Both of the propellers 310A and 310B can sometimes appear in the field-of-view 440 of the imaging device 400. The propellers 310A and 310B can be individual calibrated to avoid interfering with imaging using the systems and methods described above. However, even when the propellers 310A and 310B are individually calibrated, improper phasing (or rotational offset) between the propellers 310A and 310B can result in further undesired inter-propeller interference with imaging by the imaging device 400.

The interference that can result from improper phasing between the propellers 310A and 310B is illustrated at the top panel of FIG. 10, in which the propellers 310A and 310B have a rotational offset $\omega o_1$ relative to one another. The rotational offset $\omega o_1$ can be found as a difference between a rotational position $\omega_1$ of the first propeller 310A and a rotational position $\omega_2$ of the second propeller 310B. Here, the first propeller 310A is shown as rotating clockwise and exiting the field-of-view 440, while the second propeller 310B is shown as rotating counter-clockwise and entering the field-of-view 440. Accordingly, the propellers 310A and 310B successively block the field-of-view 440.

Such interference can be reduced by coordination of the phasing between the propellers 310A and 310B, as illustrated at the bottom panel of FIG. 10. Here the propellers 310A and 310B have a rotational offset $\omega o_2$ relative to each other that allows reduction of interference between the propellers 310A and 310B. That is, the amount of time during which both propellers 310A and 310B are in respective allowed positions 360 is increased by determining an appropriate rotational offset $\omega o$ that reduces inter-propeller imaging interference. The propellers 310A and 310B can be operated based on the determined rotational offset $\omega o$.

Although FIG. 10 shows the mobile platform 100 as having two propellers 310A, 310B in the field-of-view 440 for illustrative purposes only, any number of propellers 310 and/or other portions of the mobile platform 100 can come within the field-of-view 440. The methods and systems described herein can be used to resolve interference between two or more such portions, as desired. For example, if more than two propellers 310 can potentially obstruct the field-of-view 440, a pair-wise rotational offset $\omega o$ that reduces inter-propeller imaging interference can be determined, and the propellers 310 can be operated according to the pair-wise rotational offsets ωo.

Figure 11:
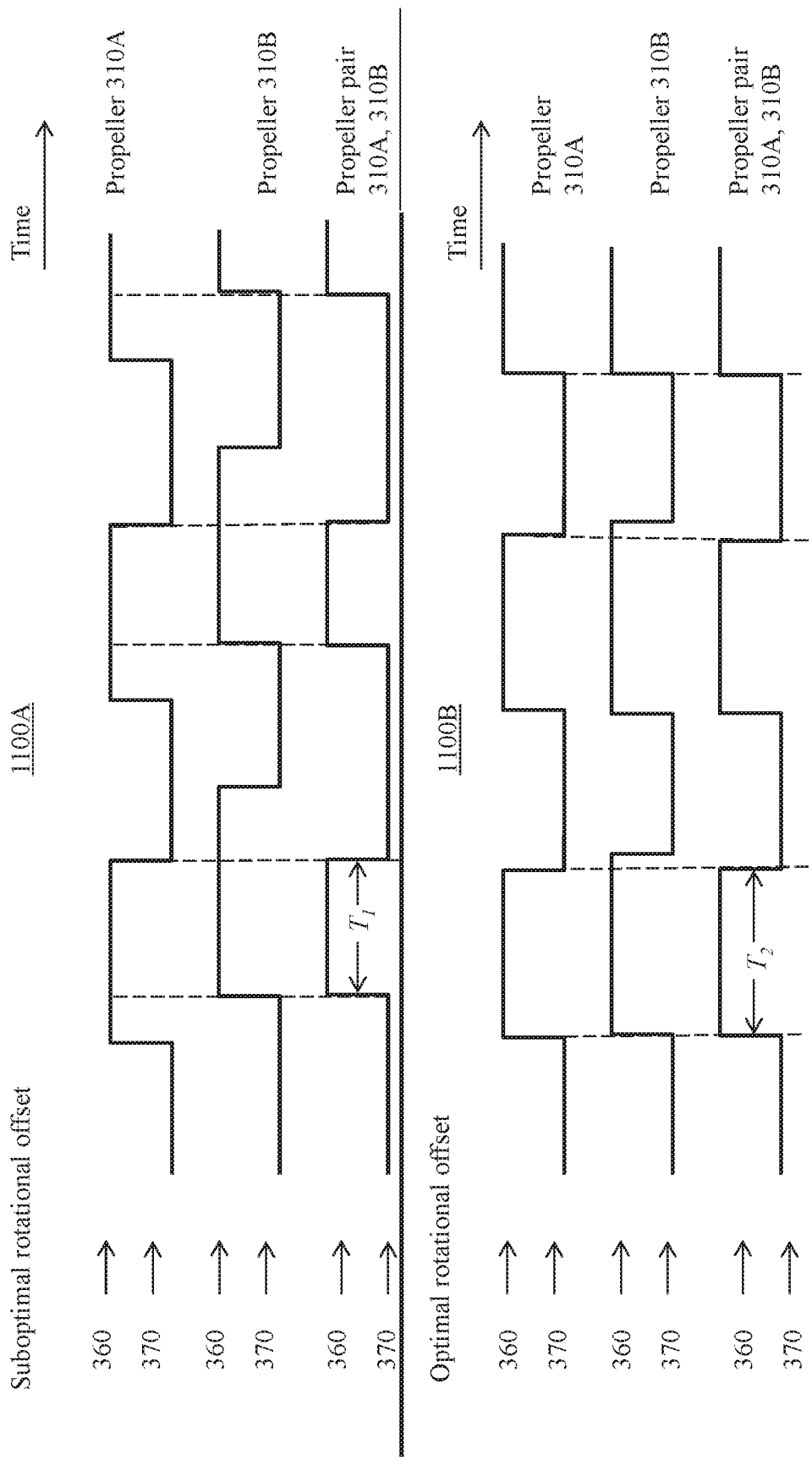
FIG. 11 is an exemplary diagram illustrating allowed and disallowed positions of two propellers over time and potential interference caused by incorrect phasing between the two propellers.

Turning to FIG. 11, two sets of position-time diagrams 1100A and 1100B are shown for two different rotational offsets $ωo_1$ and $ωo_2$, respectively. Each set of position-time diagrams 1100 shows three waveforms: (1) a first waveform showing allowed positions 360 and disallowed positions 370 of the first propeller 310A; (2) a second waveform showing allowed positions 360 and disallowed positions 370 of the second propeller 310A; and (3) a third waveform showing allowed positions 360 and disallowed positions 370 for when both the first and second propellers 310A and 310B are engaged. Each position-time diagram 1100A, 1100B shows the transitioning between rotational positions of the first propeller 310A, the first propeller 310B, and a propeller pair 310A, 310B. An allowed position 360 of the propeller pair 310A, 310B can be achieved when both of the propellers 310A, 310B are in respective allowed positions 360.

As shown at 1100A, at a non-optimal rotational offset $ωo_1$, the allowed positions 360 occur during a time period $T_1$. As shown at 1100B, at an optimal rotational offset $ωo_2$, the allowed positions 360 occur during a time period $T_2$ that is greater than $T_1$. FIG. 11 shows the exposure time $T_2$ as being obtained by adjusting the rotational offset to achieve the best overlap between the respective allowed positions 360 of the propellers 310A, 310B. The optimal rotational offset can maximize the exposure time for the imaging device 400. In some embodiments, the optimal rotational offset maximizes the number of allowed positions 360 of the propeller pair 310A, 310B, that is, maximizes rotational positions in which the propellers 310A, 310B both do not obstruct the field-of-view 440.

Accordingly, in the methods presented herein, a rotational offset ωo can be determined that avoids interference between the propellers 310A, 310B within the field-of-view of the imaging device. The rotational offset ωo between two or more propellers 310 can be obtained in any manner. As shown in FIG. 11, the rotational offset ωo can be adjusted based on the position-time diagram of each of the first and second propellers 310A, 310B to obtain the optimal rotational offset ωo. For example, allowed positions 360 and/or disallowed positions 370 can be obtained for each of the propellers 310A, 310B on an individual basis. The resulting position-time waveforms obtained for the propellers 310A, 310B can be adjusted relative to each other until an optimum overlap in allowed positions 360 is achieved. Additionally and/or alternatively, the optimal rotational offset can be obtained by acquiring and analyzing relative position images 470, as shown in FIG. 12.

Figure 12:
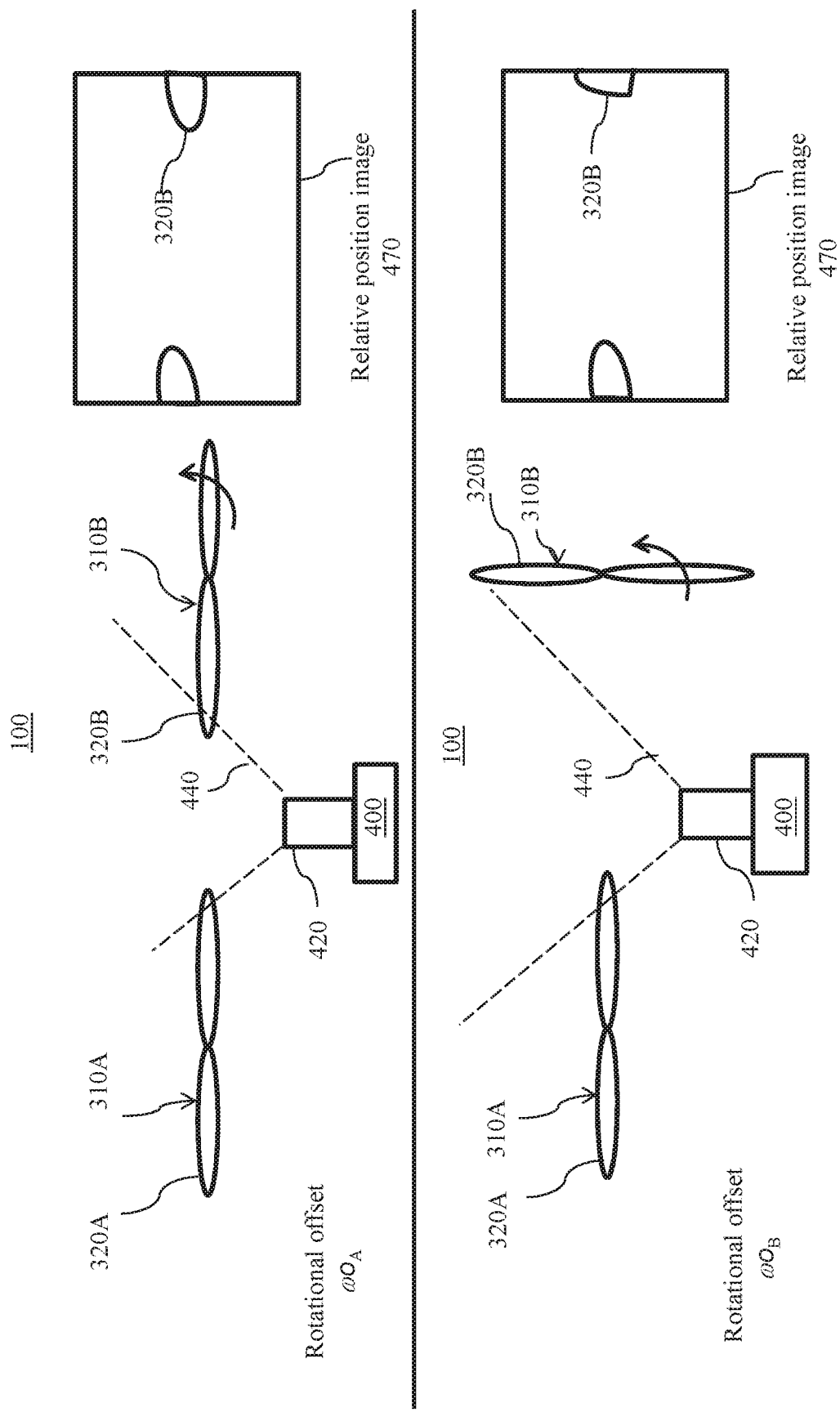
FIG. 12 is an exemplary diagram illustrating an embodiment of a method for determining a rotational offset according to relative position images taken for two propellers.

Turning now to FIG. 12, optimal rotational offset ωo between two or more propellers 310 can be obtained by using the imaging device 400 to capture a plurality of relative position images 470. The relative position images 470 can be used to capture the propellers 310A, 310B at respective rotational offsets. As shown in FIG. 12, at least one relative position image 470 can be selected (for example, either manually or automatically). The selected relative position image 470 can capture a portion of both of the first propeller 310A and the second propeller 310B. For example, at rotational offset $ωo_A$, the first propeller 310A is parallel (or aligned) with the second propeller 310B and both propellers 310A, 310B appear in the relative position image 470. At rotational offset $ωo_B$, the first propeller 310A is vertical to the second propeller 310B, and the second propeller, 310B is nearly out of the field-of-view 440. Based on any of the one or more relative position image 470 that includes the propellers 310A, 310B, a current inter-propeller rotational offset can be determined correspondingly. The rotational offset ωo for minimizing interference between the propellers 310A, 310B can be determined based on the current inter-propeller rotational offset determined for each of the relative position image 470, as further described below.

Figure 13:
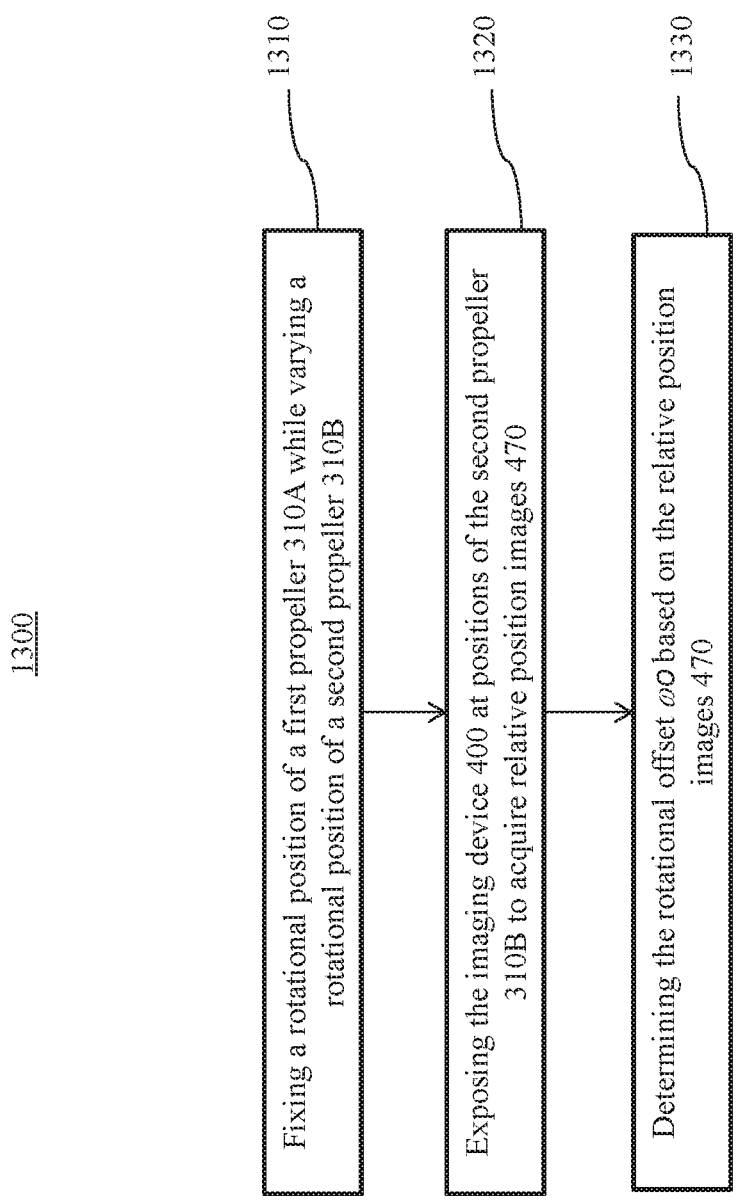
FIG. 13 an exemplary flow chart illustrating an embodiment of a method for determining a rotational offset according to relative position images taken for two propellers.

Turning to FIG. 13, an exemplary method 1300 for determining an optimal rotational offset ωo between the propellers 310A, 310B is shown. At 1310, a rotational position of the first propeller 310A can be fixed, while a rotational position of the second propeller 310B is varied. Thus, a plurality of rotational offsets ωo corresponding to the varied positions of the second propeller 310B can be established between the propellers 310A, 310B. At 1320, the imaging device 400 can be exposed at the rotational positions of the second propeller 310B to acquire relative position images 470. The process can be repeated, as desired at different fixed positions of the first propeller 310A to yield a number of relative position images 470. At 1330, the rotational offsets ωo that minimizes interference between the propellers 310A, 310B can be determined based on the relative position images 470.

In some embodiments, the relative position images 470 that include an image of at least one propeller blade 320A of the first propeller 310A and at least one propeller blade 310B of the second propeller 310B can be selected. The current rotational offset can be found between the first and second propellers 310A, 310B based on a relative position between the first and second propellers 310A, 310B in one or more of the relative position images 470. The optimal rotational offset ωo can be determined based on the current rotational offset for each of the relative position images 470. For example, the optimal rotational offset ωo can be determined to be a rotational offset that occurs in the fewest number of relative position images 470.

Figure 14:
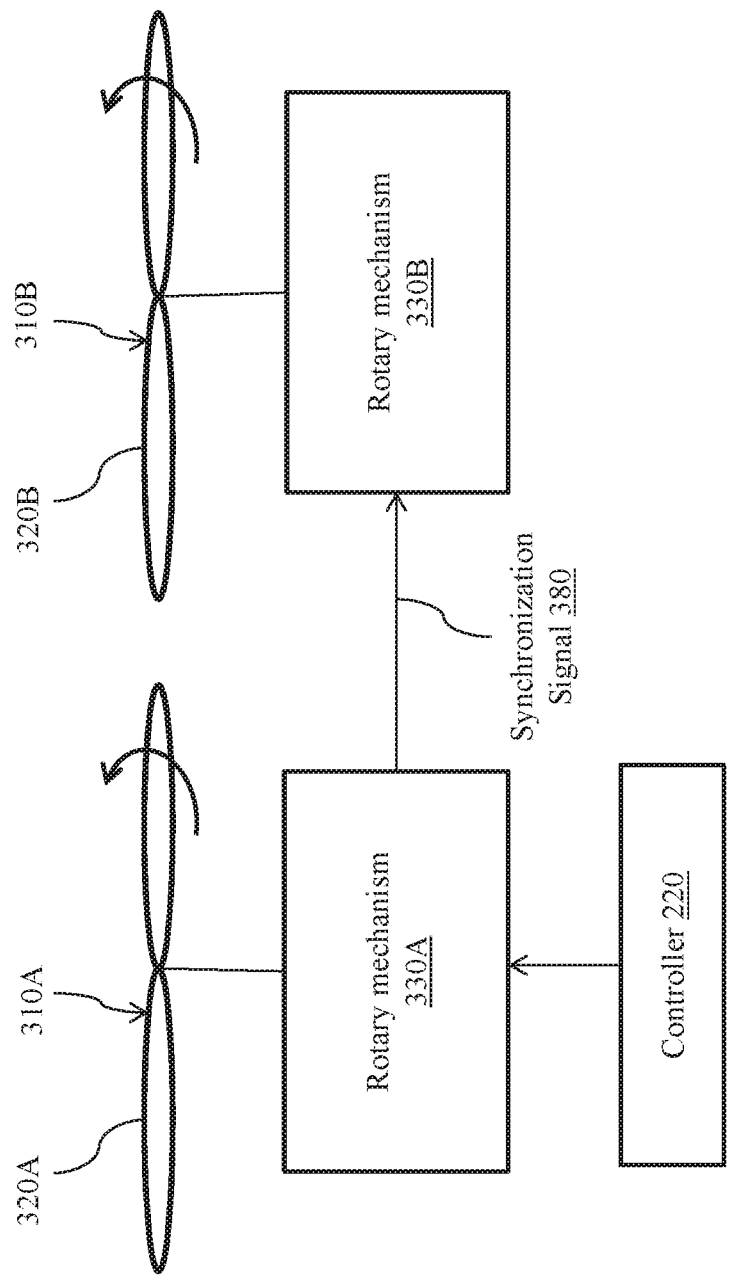
FIG. 14 is an exemplary diagram illustrating an embodiment of the mobile platform of FIG. 1, wherein two rotary mechanism are controlled using a synchronization signal sent from the first rotary mechanism to the second rotary mechanism.

During operation of the mobile platform 100, rotation of the second propeller 310B can be offset relative to the first propeller 310A according to the rotational offset ωo in any suitable manner. For example, as shown in FIG. 14, the first propeller 310A and the second propeller 310B are rotationally coupled with respect to a first rotary mechanism 330A and a second rotary mechanism 330B, respectively. The controller 220 can control the first rotary mechanism 330A to take selected rotary positions. The first rotary mechanism 330A can then transmit a synchronization signal 380 to the second rotary mechanism 330B to offset rotation of the second propeller 310B according to a rotational offset ωo between the first and second propellers 310A, 310B. In other words, the controller 220 can synchronize the rotary mechanisms 330A, 330B via a master-slave mechanism. Advantageously, by controlling rotary positions of the first rotary mechanism 330A, the controller 220 can indirectly control rotary positions of the second rotary mechanism 330B to achieve the optimal inter-propeller rotational offset. Such a master-slave mechanism can be extended to cases where more than two propellers 310 or other portions of the mobile platform 100 can potentially obstruct the field-of-view 440 of the imaging device 400.

In some embodiments, each of the rotary mechanisms 330A, 330B can optionally include an actuation controller (not shown). The actuation controller can include a communication interface, for example, for sending and/or receiving the synchronization signal 380. The actuation controller can include a microprocessor and/or any other suitable circuitry for controlling the rotary positions of the propellers 310A or 310B according to the synchronization signal 380.

Figure 15:
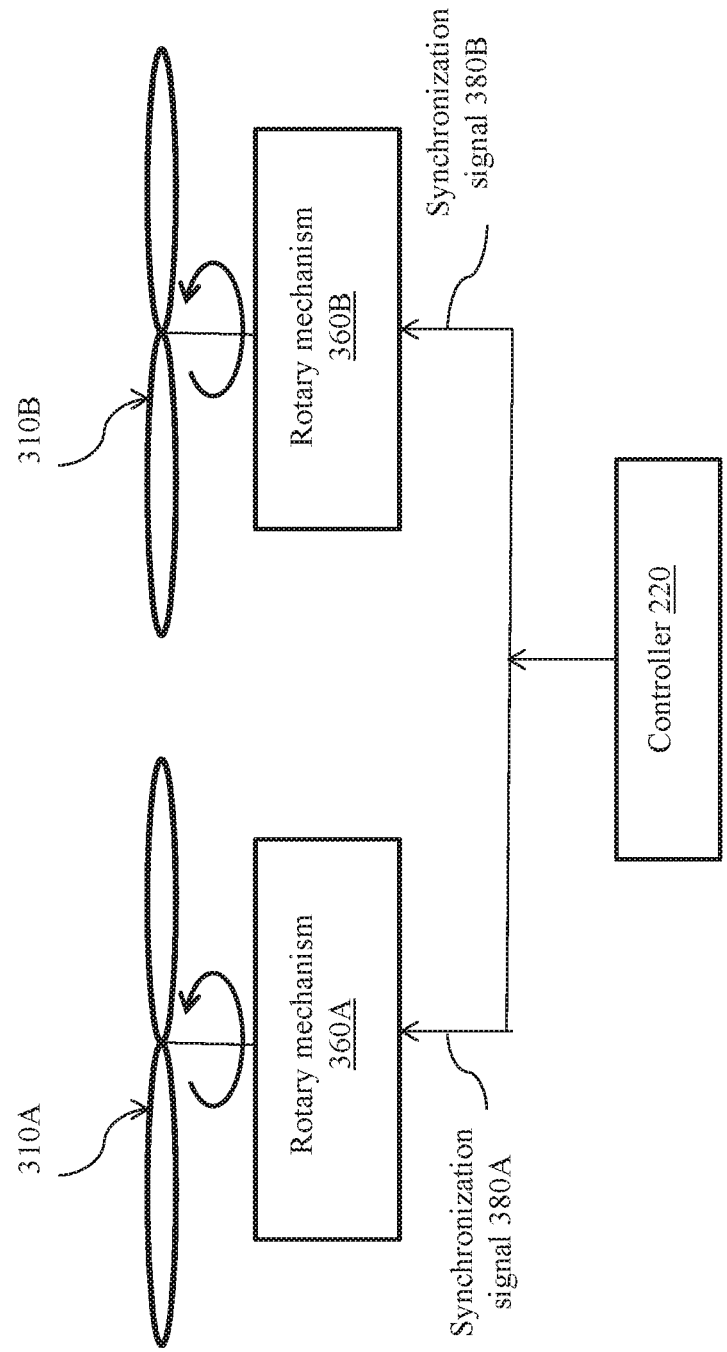
FIG. 15 is an exemplary diagram illustrating another embodiment of the mobile platform of FIG. 1, wherein two rotary mechanisms are controlled using synchronization signals sent from a controller.

Turning now to FIG. 15, another exemplary mobile platform 100 is shown as executing a method for offsetting rotation of the second propeller 310B relative to the first propeller 310A according to the rotational offset ωo. Both the first rotary mechanism 330A and the second rotary mechanism 330B are shown as being in communication with a controller 220. The controller 220 can send first and second synchronization signals 380A, 380B to the first rotary mechanism 330A and the second rotary mechanism 330B, respectively, in a coordinated fashion (for example, according to the rotational offset ωo). The synchronization signals 380A, 380B can trigger the rotary mechanisms 330A, 330B to reach respective rotational positions to keep the optimal rotational offset ωo between rotational positions of the propellers 310A and 310B. Thus, the controller 220 can also be referred to as a central controller for coordinating and/or synchronizing rotational positions of the propellers 310A, 310B.

Figure 16:
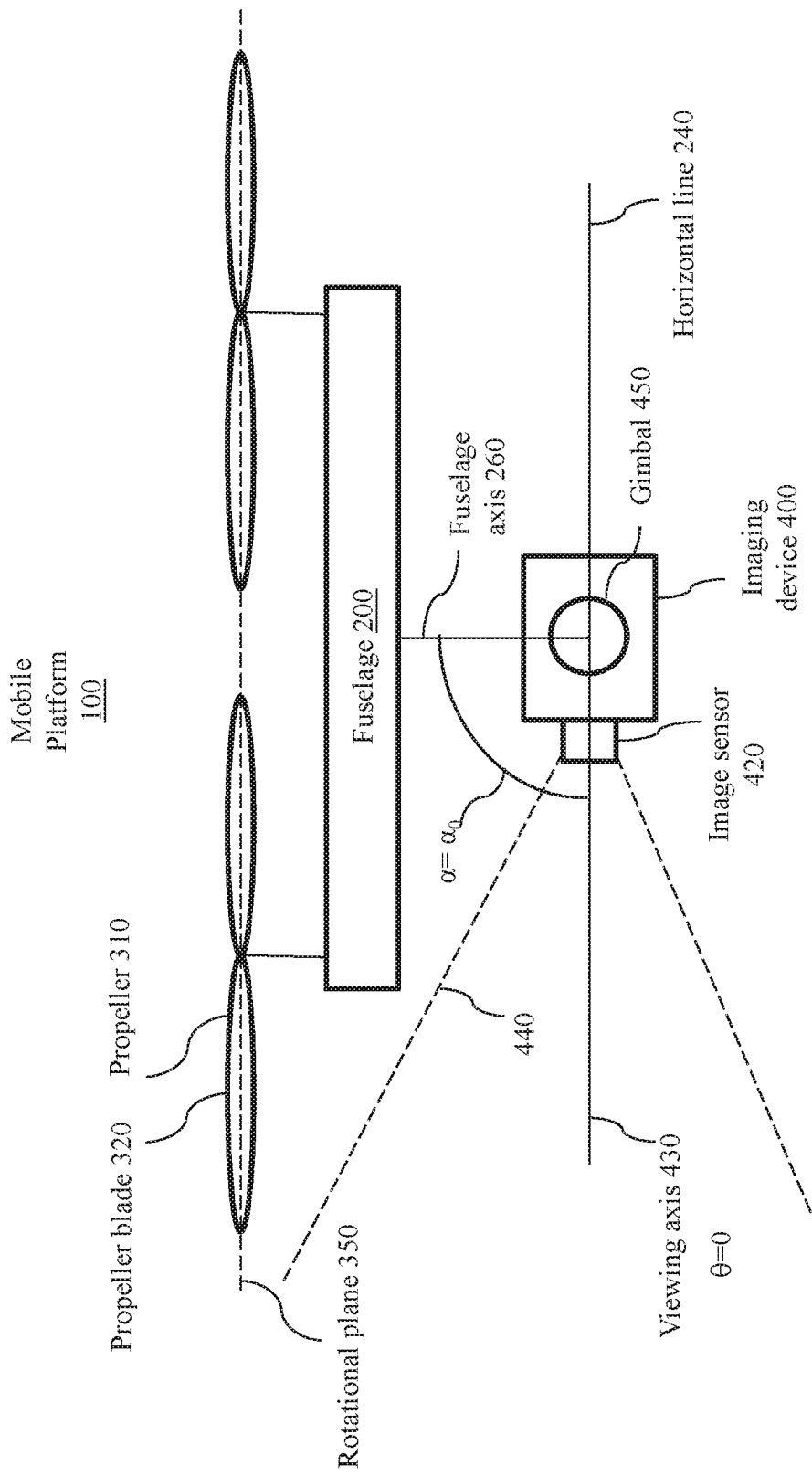
FIG. 16 is an exemplary diagram illustrating an embodiment of the mobile platform of FIG. 1, wherein a tilt angle of a gimbal attaching the imaging device is shown.

Turning now to FIG. 16, an exemplary mobile platform 100 is shown as having an imaging device 400 having a pitch angle α relative to the mobile platform 100. In various embodiments, the pitch angle α can be a pitch angle between the imaging device 400 and the fuselage 200 of the mobile platform 100. Stated somewhat differently, the pitch angle α can an angle between a viewing axis 430 of the imaging device 400 and a fuselage axis 260 of the fuselage 200. An exemplary viewing axis 430 shown in FIG. 16 can include a viewing axis 430 of the image sensor 420. The viewing axis 430 can have a viewing angle θ relative to an external environment of the mobile platform 100 (for example, the ground). In FIG. 16, the imaging device 400 is shown as having a viewing angle θ=0. An exemplary fuselage axis 260 can include an axis that is perpendicular to the fuselage 200. For example, when the mobile platform 100 lands on ground, the fuselage 200 can have a surface that is horizontal to the ground, and the fuselage axis 260 can be vertical to such a surface of the fuselage 200. In various embodiments, the fuselage axis 260 can be perpendicular to a rotational plane 350 of the propeller 310. The mobile platform 100 can control the pitch angle α to take any value, as desired.

As shown in FIG. 16, the exemplary mobile platform 100 is shown as having an imaging device 400 that is operatively mounted to a fuselage 200 of the mobile platform 100 using a gimbal 450. The gimbal 450 can be used for precise rotational and/or translational positioning of mounted objects, such as the imaging device 400. The gimbal 450 can include one or more pivoted supports (not shown) that are mounted with respect to one or more axes of rotation, thereby allowing a mounted object to be rotationally independent with respect to a fixture (here, the fuselage 200) to which the gimbal 450 is mounted. The manner of configuring and mounting the pivoted supports can vary and can include, for example, concentric ring structures and non-ring structures. Depending on the number of degrees of freedom desired, the gimbal 450 can include any suitable number, including one, two, or three, pivoted supports. The gimbal 450 can include various mechanical apparatus as needed, such as ball bearings, tracks, actuators, and the like. The gimbal 450 can be configured to respond to external commands (for example, from a processor) directing movement of imaging device 400 to desired positions.

In some cases, for example, when the mobile platform 100 is suspending in air in no wind or low wind condition, the fuselage 200 can be parallel to ground. FIG. 16 shows a horizontal line 240 as representing the ground. The viewing axis 430 can be parallel to, and/or as shown in FIG. 16, overlapping with the horizontal line 240. In this case, the pitch angle α can be a steady-state pitch angle $\alpha_0$. An exemplary value of the steady-state pitch angle $\alpha_0$ can be 90 degrees.

Figure 17:
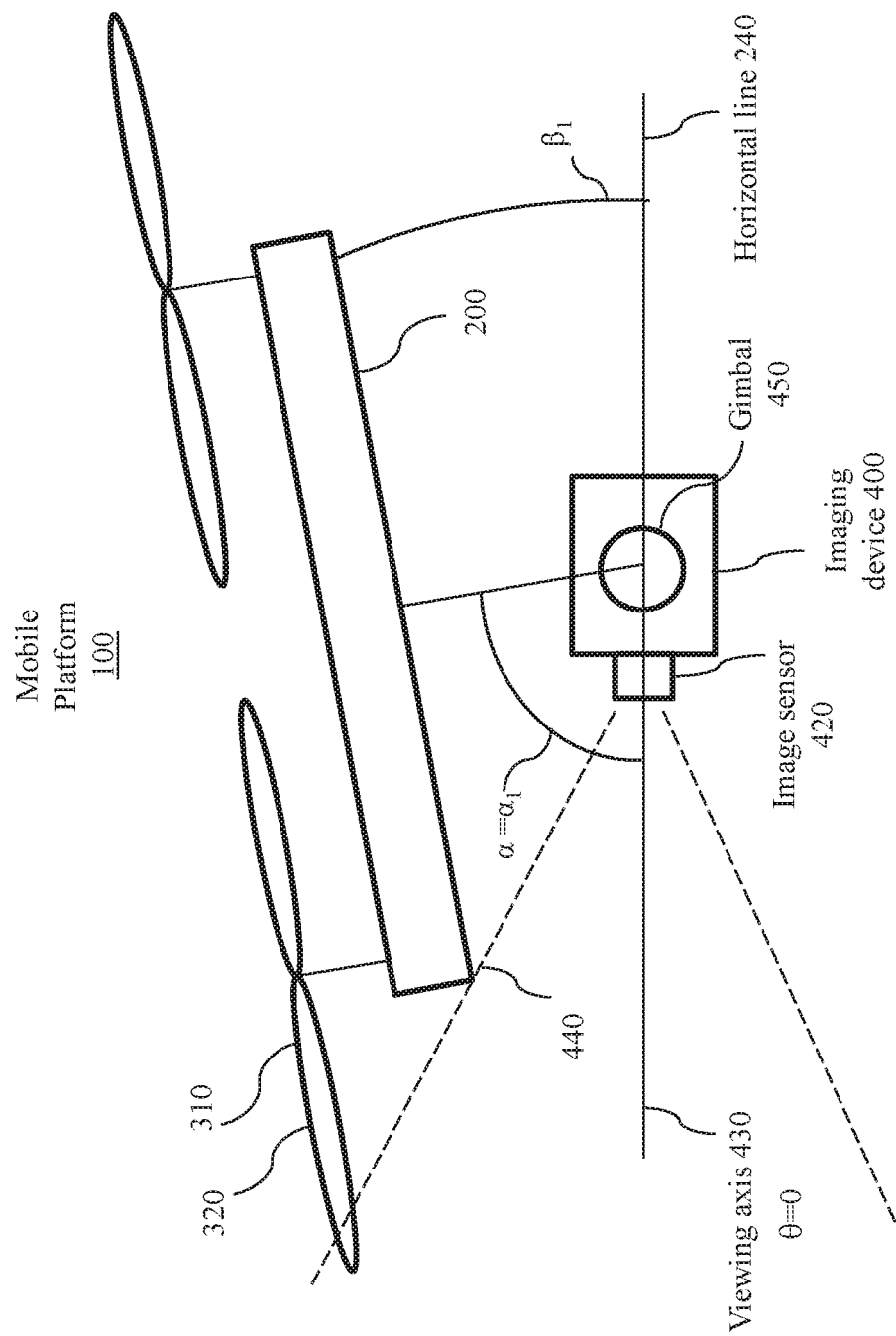
FIG. 17 is an exemplary diagram illustrating another embodiment of the mobile platform of FIG. 1, wherein the mobile platform is tilted forward such that propellers are within a field-of-view of the imaging device.

Turning to FIG. 17, the fuselage 200 is shown to have a fuselage angle $\beta_1$ relative to the horizontal line 240. The fuselage angle $\beta_1$ is shown in FIG. 17 as being greater than zero degrees. For example, the mobile platform 100 can have the fuselage angle $\beta_1$ when the mobile platform 100 travels in a direction in which the image sensor 420 captures images, or when the mobile platform 100 is hovering in air against an oncoming headwind.

In such instances, where the viewing axis 430 remains parallel to the horizontal line 240, the pitch angle α can take a value of $\alpha_1$. With reference to FIG. 16, $\beta_1$ and $\alpha_1$ can have the following relationship:

$$\beta_1 + \alpha_1 = \alpha_0 \qquad \text{Equation (1)}$$

As shown in FIG. 17, the propeller blades 320 of the propeller 310 can obstruct the field-of-view 440 of the imaging device 400. For example, at the pitch angle $\alpha_1$, the propeller blades 320 can obstruct the field-of-view 400 in some or all rotational positions of the propeller 310. As desired, the fuselage angle β can be reduced (for example, by controlling the mobile platform through the propeller mechanisms 300) to alleviate such obstructions, as shown in FIG. 18, without affecting the imaging angle of the imaging device 400.

Figure 18:
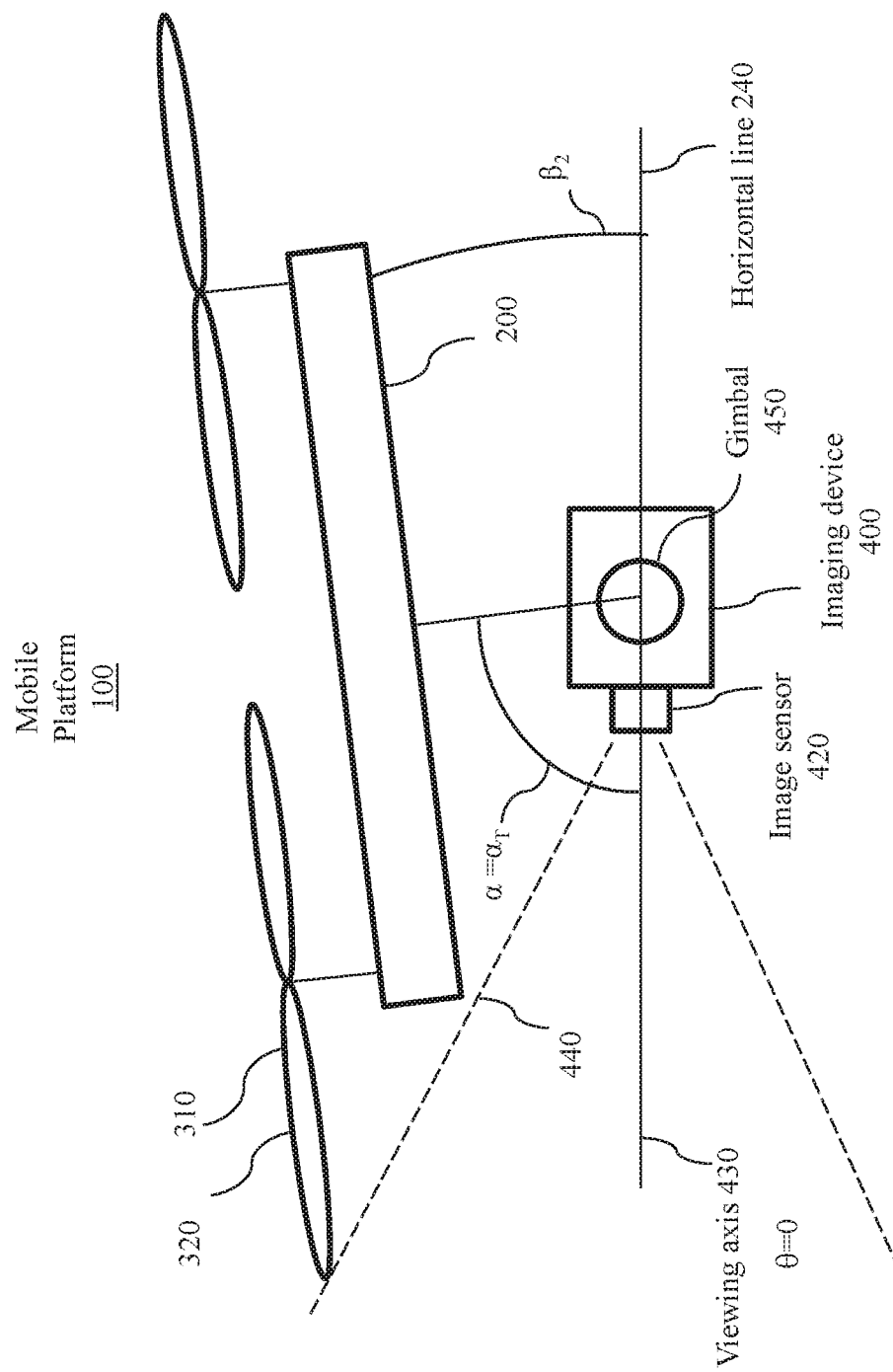
FIG. 18 is an exemplary diagram illustrating another embodiment of the mobile platform of FIG. 1, wherein the mobile platform is tilted forward to a threshold pitch angle, such that propellers do not obstruct the field-of-view of the imaging device.

Turning to FIG. 18, the fuselage angle β has been reduced relative to FIG. 17, such that the pitch angle α is equal to a threshold pitch angle $\alpha_T$. As shown in FIG. 18, when the pitch angle α is greater than or equal to the threshold pitch angle $\alpha_T$, the propeller blades 320 of the propellers 310 do not obstruct the field-of-view 440 of the imaging device 400. Stated somewhat differently, the threshold pitch angle $\alpha_T$ can be the smallest value of the pitch angle α that prevents the propeller blade 320 of the propeller 310 from obstructing the field-of-view 440. In some embodiments, the threshold pitch angle $\alpha_T$ is a pitch angle at which the propeller blades 320 do not obstruct the field-of-view 440 in any rotational positions of the propellers 310. In some embodiments, the threshold pitch angle $\alpha_T$ is a pitch angle at which the propeller blades 320 do not obstruct the field-of-view 440 in some, but not all rotational positions of the propellers 310. In the latter case, for a specific pitch angle, the propeller blades 320 do not obstruct the field-of-view 440 in a set of allowed positions 360, but do obstruct the field-of-view 440 in a set of dis-allowed positions 370. By operating the mobile platform 100 at or above the threshold pitch angle $\alpha_T$, interference from propellers 310 can advantageous be reduced or prevented.

Figure 19:
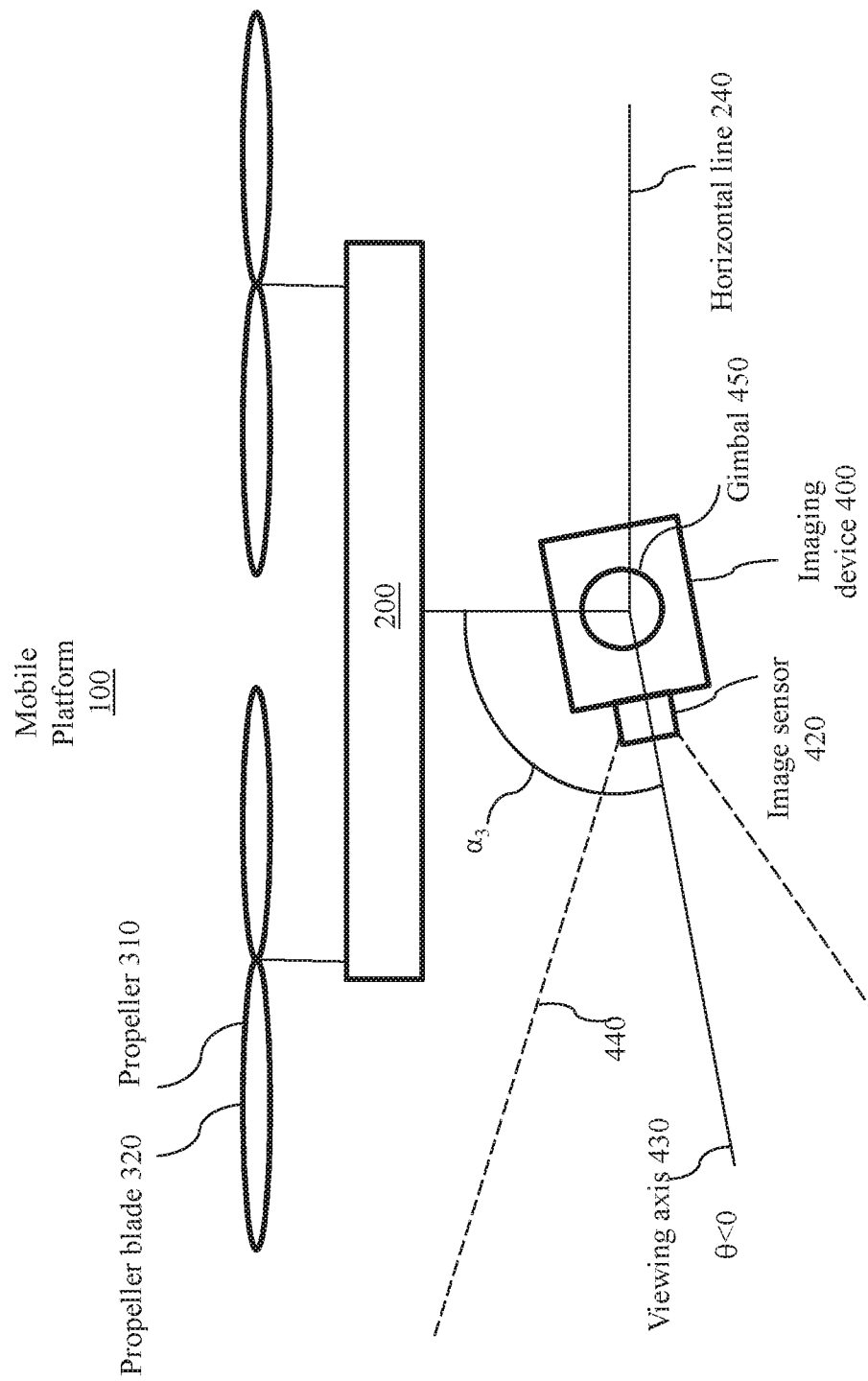
FIG. 19 is an exemplary diagram illustrating another embodiment of the mobile platform of FIG. 1, wherein the imaging device is tilted downward relative to a horizontal line.

Turning to FIG. 19, the imaging device 4400 is shown as being angled downwards relative to the horizontal line 240 with a viewing angle θ<0. The pitch angle α as shown is $\alpha_3$, which is greater than the steady-state pitch angle $\alpha_0$ shown in FIG. 18. The pitch angle $\alpha_3$ can be greater than the threshold tilt angle $\alpha_T$, so the propeller blade 320 of the propeller 310 does not obstruct the field-of-view 440.

Figure 20:
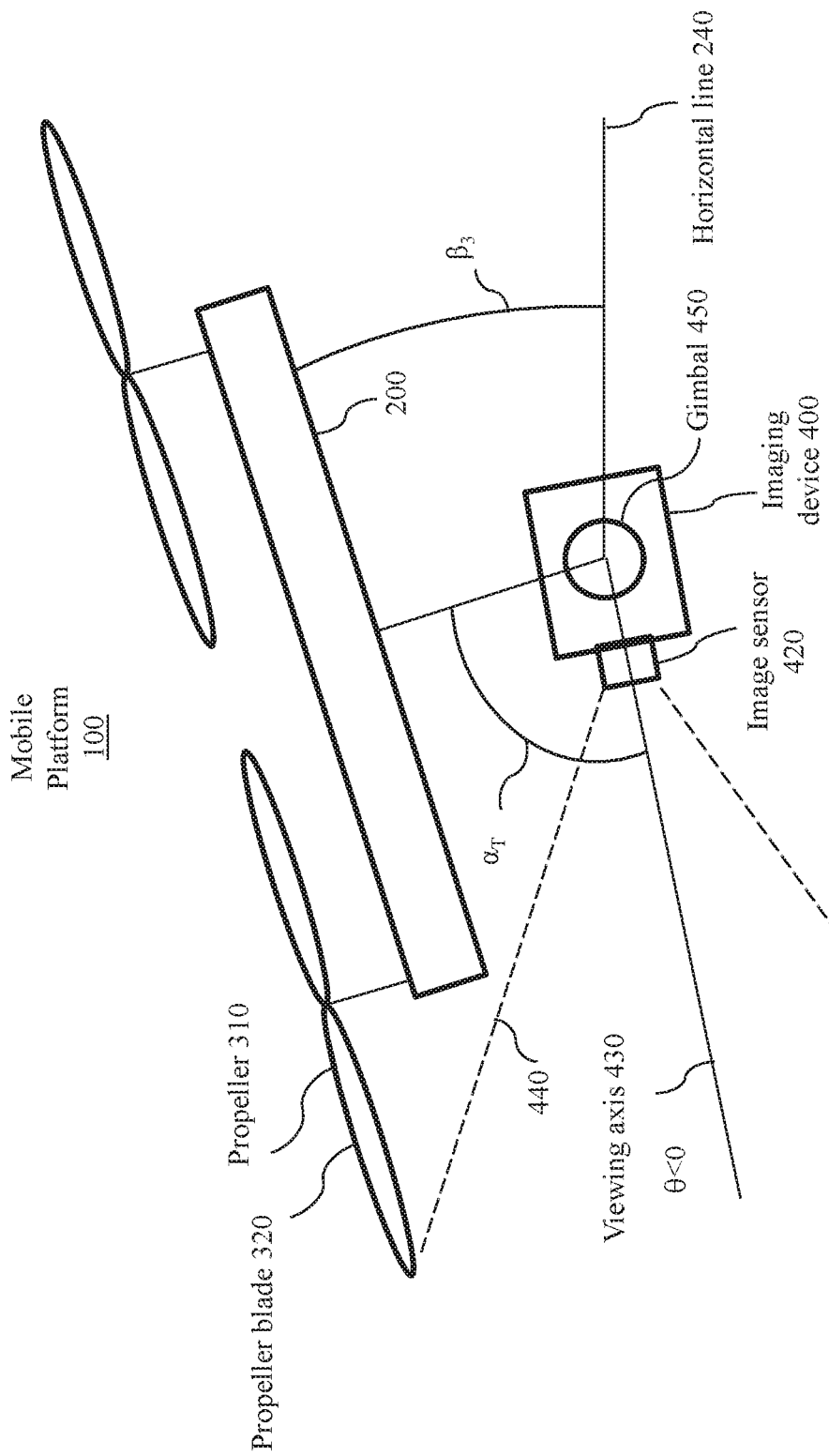
FIG. 20 is an exemplary diagram illustrating another embodiment of the mobile platform of FIG. 1, wherein the imaging device is tilted downward relative to a horizontal line, and the mobile platform is tilted forward to a threshold pitch angle, such that propellers do not obstruct the field-of-view of the imaging device.

Turning to FIG. 20, the fuselage has tilted forward, resulting in the fuselage angle $\beta_3$ being larger relative to FIG. 19, even while the viewing angle θ is maintained relative to the horizontal line 240 as shown in FIG. 19. The tilt angle has correspondingly been reduced to the threshold tilt angle $\alpha_T$, at which the propeller blades 320 of the propeller 310 do not obstruct the field-of-view 440. Changing the tilt angle of can advantageously improve flight performance of the mobile platform 100 in a direction parallel to the horizontal line 240. In some embodiments, in the event that adjusting the tilt/fuselage angle can limit the flying speed of the mobile platform 100 or affect operational safety, the mobile platform 100 can warn an operator (for example, by sending a warning to a remote control (not shown)), so adjustment of the tilt/fuselage angle can be disabled.

Figure 21:
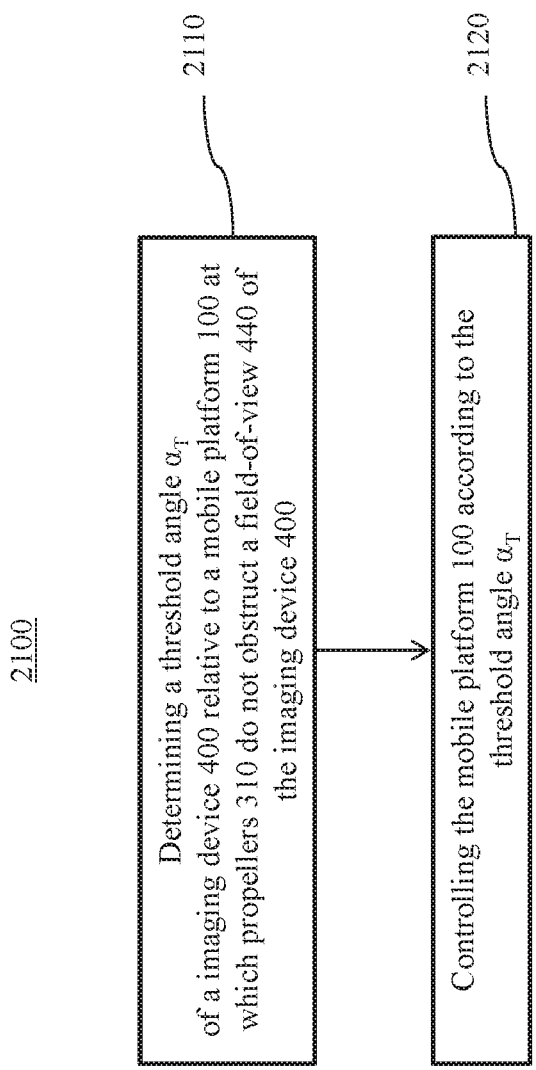
FIG. 21 is an exemplary top-level flow chart illustrating an embodiment of a method for operating the mobile platform of FIG. 1.

In accordance with the examples given above, turning now to FIG. 21, an exemplary method 2100 for operating a mobile platform 100 is shown. At 2110, a threshold angle $\alpha_T$ of the imaging device 400 relative to the mobile platform 100 at which components of the mobile platform 100 do not obstruct the field-of-view of the imaging device 400 can be determined. For example, the threshold angle $\alpha_T$ can be an angle at which propellers 310 of the mobile platform 100 do not obstruct the field-of-view of the imaging device 400. Although the threshold angle $\alpha_T$ is shown in some examples herein as being a threshold pitch angle, the threshold angle $\alpha_T$ can also be threshold roll angle or a threshold yaw angle, as appropriate. In some embodiments, the threshold angle can include a combination of threshold pitch, roll, and yaw angles, in accordance with the positioning of various components of the mobile platform 100 and/or other geometrical factors.

In some embodiments, the threshold angle $\alpha_T$ can be determined at the angle at which the propellers 310 do not obstruct the field-of-view 400 at all positions of the propellers 310. The threshold angle $\alpha_T$ can be determined by exposing the imaging device 400 at a plurality of angles relative to the mobile platform 100 and, for each angle, at a plurality of rotational positions of the propellers 310 to acquire a plurality of images 480 for each pitch angle. The threshold angle $\alpha_T$ can be selected as a minimum angle at which the propellers 310 do not obstruct the field-of-view 440 in any of the images 480 at the respective pitch angle.

In other embodiments, the threshold angle $\alpha_T$ can be determined at the angle at which the propellers 310 do not obstruct the field-of-view 440 at allowed rotational positions 360 of the propellers 310, but not necessarily at all positions of the propellers 310. In such embodiments, the threshold angle $\alpha_T$ can be determined by finding allowed rotational positions 360 of the propellers 310 at a plurality of angles of the imaging device 400 relative to the mobile platform 100, and selecting the threshold angle $\alpha_T$ as a minimum angle having at least a threshold number (for example, at least one) of allowed rotational positions 360.

The allowed rotational positions 360 at any particular angle can be determined according to any of the methods described above. For example, the allowed rotational positions 360 can be found by exposing the imaging device 400 at a plurality of positions of the propellers 310 to obtain images 480, and using the images 480 to find the allowed positions 360 of the propellers 310 that do not obstruct the field-of-view 440. The allowed positions 360 can be determined, for example, by selecting images 480 in which propellers 310 are not visible, manually and/or automatically.

At 2120, the mobile platform 100 can be controlled according to the threshold angle $\alpha_T$ of the imaging device 400. In some embodiments, the mobile platform 100 can be controlled by adjusting a movement angle of the mobile platform 100 during operation (for example, during flight or other movement) according to the threshold angle $\alpha_T$. In some embodiments, the pitch angle, roll angle, yaw angle, or any combination thereof can be adjusted according to the threshold angle $\alpha_T$. Alternatively, and/or additionally, a viewing angle θ of the imaging device can be controlled according to the threshold angle $\alpha_T$ of the imaging device 400. In some embodiments, the pitch angle, roll angle, yaw angle of the imaging device 400 relative to the external environment of the imaging device 400, or any combination thereof, can be adjusted according to the threshold angle $\alpha_T$. Accordingly, both movement angle of the mobile platform 100 and/or the viewing angle viewing angle θ of the imaging device can be adjusted to avoid imaging components of the mobile platform 100.

In some embodiments, to improve performance of the mobile platform 100, a fuselage angle β and a pitch angle α can be adjusted to maintain a constant field-of-view 440 of the imaging device 400 as desired by a user. For example, a movement angle of the mobile platform 100 can be adjusted to maintain a constant viewing angle θ specified by a user. Alternatively, and/or additionally, the movement angle can be adjusted so as to maintain a constant viewing angle θ of the imaging device 400 relative to an operating environment of the mobile platform 100. For example, the imaging device 400 can be maintained at a constant angle relative to the ground surface. The mobile platform 100 can also be controlled, as described in various examples above, by determining a rotational position of each propeller 310 based on a rotational position of a rotary mechanism 330 operatively coupled to the propeller 310, and transmitting an exposure signal to the imaging device 400 while the propeller is in an allowed position 360. Furthermore, in some embodiments, the exposure of the imaging device can be controlled to be limited to an exposure time according to a rotational speed and number of propeller blades of each propeller 310, as described above.

In some embodiments, the determining step at 2110 can be carried on an apparatus separate from the mobile platform 100. The apparatus can be, for example, a user terminal (not shown). The user terminal can be configured to interact with a user (not shown) to operate the mobile platform and/or present data collected by the mobile platform 100 to the user. The user terminal can include, for example, remote controllers (not shown), portable computers, laptops, mobile devices, handheld devices, mobile telephones (for example, smartphones), tablet devices, tablet computers, personal digital assistants, handheld consoles, portable media players, wearable devices (for example, smartwatches and head-mounted displays), and the like. The apparatus can have one or more processors configured to carry out any of the methods described herein. Suitable processors are described above with reference to a processor 222 of the mobile platform 100 in FIG. 3. In some embodiments, data (such as a threshold angle) can be transmitted from the apparatus to the mobile platform 100 as needed.

The disclosed embodiments are susceptible to various modifications and alternative forms, and specific examples thereof have been shown by way of example in the drawings and are herein described in detail. It should be understood, however, that the disclosed embodiments are not to be limited to the particular forms or methods disclosed, but to the contrary, the disclosed embodiments are to cover all modifications, equivalents, and alternatives.

What is claimed is:
1. A method of imaging on a mobile platform, comprising:
exposing an imaging device mounted aboard the mobile platform at a plurality of positions of a propeller of the mobile platform to capture images in a field-of-view;

determining, by analyzing the captured images, allowed positions of the propeller that do not obstruct the field-of-view of the imaging device; and controlling the imaging device according to the allowed positions of the propeller to avoid imaging the propeller, including:

determining a rotational position of the propeller based on a rotational position of a rotary mechanism operatively coupled to the propeller; and adjusting the imaging device based on a result of determining the rotational position in an unobstructed view by the propeller of the mobile platform.

2. The method of claim 1, wherein exposing the imaging device at the plurality of positions of the propeller comprises exposing the imaging device at multiple rotational speeds of the propeller.

3. The method of claim 1, wherein determining the allowed positions of the propeller comprises manually selecting images in which the propeller is not visible.

4. The method of claim 1, wherein determining the allowed positions of the propeller comprises automatically selecting images in which the propeller is not visible by recognition of a pattern on the propeller.

5. The method of claim 1, wherein the propeller is rotationally coupled with respect to the rotary mechanism, and determining the rotational position of the propeller comprises determining the rotational position of the propeller based on a rotational offset from the rotational position of the rotary mechanism.

6. The method of claim 1, wherein adjusting the imaging device comprises transmitting an exposure signal to the imaging device while the propeller is in one of the allowed positions.

7. The method of claim 1, wherein adjusting the imaging device comprises:

transmitting an exposure signal to the imaging device when the propeller moves from a disallowed position to one of the allowed positions; and transmitting a de-exposure signal to the imaging device when the propeller moves from the one of the allowed positions to the disallowed position or another disallowed position.

8. The method of claim 1, wherein controlling the imaging device according to the allowed positions of the propeller further comprises limiting exposure time of the imaging device according to a rotational speed and number of propeller blades of the propeller.

9. The method of claim 1, wherein:

the propeller is a first propeller; and the mobile platform further comprises a second propeller;

the method further comprising:

determining a rotational offset between the first propeller and the second propeller to avoid interference between the first propeller and the second propeller within the field-of-view of the imaging device.

10. The method of claim 1, further comprising:

determining a threshold angle of the imaging device relative to the mobile platform that avoids obstruction of the field-of-view by the propeller; and adjusting a movement angle of the mobile platform or a viewing angle of the imaging device during operation according to the threshold angle.

\* \* \* \* \*